(12) United States Patent
Schroader et al.

(10) Patent No.: US 12,365,545 B2
(45) Date of Patent: Jul. 22, 2025

(54) ROLLER SHOE AND SLAT SORTER CONVEYOR

(71) Applicant: FIVES INTRALOGISTICS CORP., Louisville, KY (US)

(72) Inventors: Steven Vann Schroader, Louisville, KY (US); Richard B. Hageman, Orlando, FL (US)

(73) Assignee: Fives Intralogistics Corp., Louisville, KY (US)

( * ) Notice: Subject to any disclaimer, the term of this patent is extended or adjusted under 35 U.S.C. 154(b) by 0 days.

(21) Appl. No.: 18/698,778

(22) PCT Filed: Oct. 19, 2022

(86) PCT No.: PCT/US2022/047192
§ 371 (c)(1),
(2) Date: Apr. 4, 2024

(87) PCT Pub. No.: WO2023/069562
PCT Pub. Date: Apr. 27, 2023

(65) Prior Publication Data
US 2024/0327129 A1    Oct. 3, 2024

Related U.S. Application Data

(60) Provisional application No. 63/257,156, filed on Oct. 19, 2021.

(51) Int. Cl.
*B65G 17/34* (2006.01)
*B07C 3/08* (2006.01)
(Continued)

(52) U.S. Cl.
CPC ............ *B65G 17/345* (2013.01); *B07C 3/082* (2013.01); *B65G 37/00* (2013.01); *B65G 47/82* (2013.01);
(Continued)

(58) Field of Classification Search
CPC ...... B65G 47/82; B65G 37/00; B65G 17/345; B65G 2207/14; B65G 47/34; B65G 47/844; B07C 3/082
(Continued)

(56) References Cited

U.S. PATENT DOCUMENTS 5,613,591 A * 3/1997 Heit ..................... B65G 47/844
                                                              198/370.02
6,293,308 B1    9/2001 Hettinger
(Continued)

FOREIGN PATENT DOCUMENTS

JP    H 08-113353        5/1996
WO    WO-2000041956      7/2000

*Primary Examiner* — James R Bidwell
(74) *Attorney, Agent, or Firm* — CARRITHERS LAW OFFICE, PLLC; David W. Carrithers

(57) ABSTRACT

A roller shoe slat sorter conveyor system includes a conveyor forming an upwardly facing support surface. The support surface includes slots oriented transversely to the conveying direction and a plurality of roller shoe assemblies mounted for sliding movement along respective slots for transversely discharging objects from a medial position to either side of the conveying surface. Each roller shoe assembly includes a releasably mounted carrier disposed below the conveying surface. The releasable connection enables the roller shoe to detach from the carrier, and be manually reattached. The elongated roller shoe features downward slanting ends and includes a plurality of roller wheels extending above the surface of the shoe mounted to axles movable in a vertical axis whereby an article resting on the rollers of a shoe depresses the rollers so they contact the slat surface and move an article resting thereon at twice the speed of the shoe.

36 Claims, 21 Drawing Sheets

(51) Int. Cl.
 *B65G 37/00* (2006.01)
 *B65G 47/82* (2006.01)
 *B65G 47/84* (2006.01)

(52) U.S. Cl.
 CPC ........ *B65G 47/844* (2013.01); *B65G 2207/14* (2013.01)

(58) Field of Classification Search
 USPC ........................................ 198/370.02, 370.03
 See application file for complete search history.

(56) References Cited

U.S. PATENT DOCUMENTS

| | | | |
|---|---|---|---|
| 6,758,323 B2 | 7/2004 | Costanzo | |
| 7,147,097 B2 | 12/2006 | Lemm | |
| 7,306,086 B2 | 12/2007 | Belt | |
| 7,628,265 B2 | 12/2009 | Verploegen | |
| 8,186,501 B2 | 5/2012 | Wolkerstorfer | |
| 8,727,097 B2 | 5/2014 | Ydoate | |
| 8,820,520 B2 | 9/2014 | Triesenberg | |
| 8,985,304 B2 | 3/2015 | Guernesy | |
| 9,452,896 B2 | 9/2016 | Lee | |
| 9,795,995 B2 | 10/2017 | Zimmer | |
| 9,988,218 B2 | 6/2018 | Dugat | |
| 10,196,213 B2 | 2/2019 | Axmann | |
| 10,926,963 B1* | 2/2021 | Saurber, III | B65G 47/766 |
| 2003/0051975 A1 | 3/2003 | Ikegami | |
| 2003/0132143 A1 | 7/2003 | Cochran | |
| 2003/0168312 A1* | 9/2003 | Veit | B65G 47/844 198/347.2 |
| 2007/0221472 A1 | 9/2007 | Fourney | |
| 2008/0011582 A1 | 1/2008 | Verploegen | |
| 2010/0007206 A1* | 1/2010 | Wodrich | B62D 55/12 29/458 |
| 2012/0048677 A1* | 3/2012 | Ramankutty | B65G 23/16 198/348 |
| 2013/0220770 A1* | 8/2013 | Ydoate | B65G 47/844 198/370.02 |
| 2013/0334016 A1 | 12/2013 | Cinetic | |
| 2019/0337731 A1* | 11/2019 | Bastian, II | B65G 47/28 |

* cited by examiner

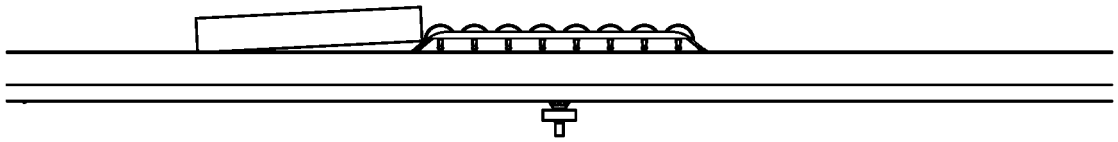
FIG.37A
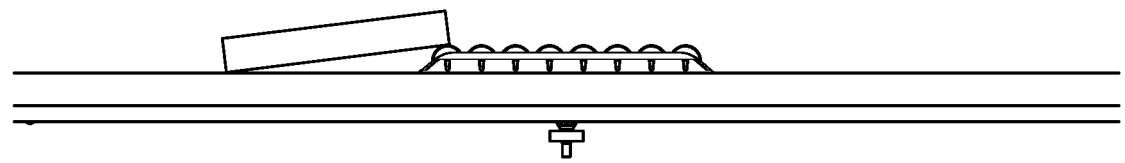
FIG.37B
FIG.37C
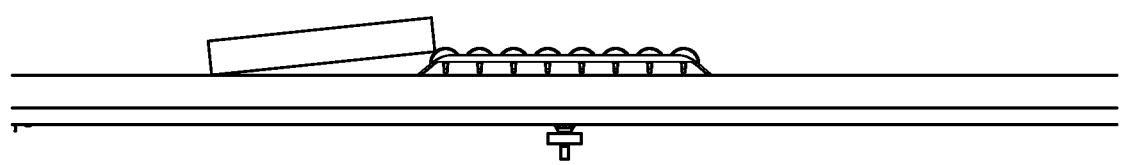
FIG.37D

ROLLER SHOE AND SLAT SORTER CONVEYOR

CROSS REFERENCES TO RELATED APPLICATIONS

This application claims priority from PCT/US22/047192 filed on Oct. 19, 2022 which claims the benefit of U.S. Provisional Application No. 63/257,156 filed on Oct. 19, 2021 and each one is incorporated by reference in its entirety.

TECHNICAL FIELD OF THE INVENTION

The present disclosure relates to shoe slat sorter conveyors for the conveying and discharging of objects at respective destinations, and in particular to releasable shoes which become disconnected in response to being acted upon by an undesirable external force and related methods.

BACKGROUND OF THE INVENTION

The background information related to the present disclosure which is not necessarily prior art and is disclosed in order to distinguish the novelty of the instant invention from conventional technology.

A shoe sorter is a type of sorter conveying system composed of a conveyor which moves in a conveying direction along a conveying route. Mounted on the conveyor are pusher shoes which are movable relative to the conveyor in a direction transversely relative to the conveying direction. Each shoe is coupled to a guide pin and wheel which can engage a guide track mounted beneath the conveying surface for determining the lateral position of the shoe relative to the conveyor surface. The rail arrangement includes diverters which can divert the travel direction of the guide pin or wheel from the conveying direction to a direction oriented transversely relative to the conveying direction. In that fashion, the shoes can push items transversely from the conveyor and onto a chute at appropriate destination sites along the conveying route. Examples of such sorters include U.S. Pat. Nos. 4,738,347, 5,333,715, 5,613,591, 5,191,959, 7,055,669, 5,027,939, 8,757,353, 7,549,527, 6,419,073, 5,038,912, 6,041,909, 5,967,289, 8,371,431, 7,516,835, Backups of objects on the chutes can occur. When that happens, the shoes may push subsequent objects toward a blocked chute that does not admit entry of those objects. Accordingly, the shoes may be subjected to considerable undesirable (e.g., above a predetermined acceptable level) external forces that can damage the shoes, the conveyor, and/or the objects being conveyed. Each shoe can be attached by a connector element which fails or breaks in response to the application of the external forces to allow the shoe to detach from its drive pin (e.g., see the connector elements 28, 228, and 260 disclosed in U.S. Pat. No. 7,628,265 issued to Verploegen et al. on Dec. 8, 2009; and the connector element 14 disclosed in U.S. Pat. No. 7,198,145 issued to Brown et al. on Apr. 3, 2007). If that occurs, reattaching the shoe requires that the failed or broken part be replaced and/or the use of tools. Reattachment can also require special knowledge and skills to perform the operation correctly. Such replacement processes can be complicated by the need to obtain replacement parts, tools, etc., which can be time consuming; possibly resulting in appreciable down-time of the sorting conveyor.

SUMMARY

In one preferred embodiment, a slat sorter conveyor apparatus includes an endless upwardly facing conveying surface movable in a conveying direction. The conveying surface is defined by a plurality of surfaces separated by a plurality of slots extending in a transverse direction relative to the conveying direction. A plurality of roller shoe assemblies, that each include a roller shoe disposed above the conveying surface and a carrier disposed below the conveying surface. Each of the plurality of roller shoe assemblies extends through at least one of the slots in the conveying surface to permit each roller shoe assembly to move in the transverse direction while also moving in the conveying direction with the conveying surface. Each of the roller shoe assemblies includes a snap-fit connection coupling the roller shoe and the carrier together. The snap-fit connection has a structure which permits the roller shoe to detach from the carrier in response to an undesirable force acting on the roller shoe without damaging any part of the roller shoe assembly. The snap-fit connection further has a structure that permits the roller shoe to be fully recoupled to the carrier manually without the use of tools after being detached from the carrier.

The elongated roller shoe features downward slanting ends and includes a plurality of roller wheels extending above the surface of the shoe mounted to axles movable in a vertical axis whereby an article resting on the rollers of a shoe depresses the rollers so they contact the slat surface and move an article resting thereon at twice the speed of the shoe moving transverse across the slat.

A slat sorter roller shoe comprises or consists of a ladder frame including a first side rail and second side rail connected by opposing downward sloped end portions. The opposing end portions join by a longitudinal center member disposed equal distance between the first side rail and second side rail. The frame includes a base comprising a pair of longitudinal ribbed runners having end edges in cooperative engagement and in a slidable relationship with the slat. The frame includes a recess at a selected location in the center member for receiving a plurality of drive projections extending upward from a top of the carrier. Each one of the roller wheels is removably mounted on an axle comprising a pair of opposing split axles, each one having an outer cap with a circumferential flange extending around the proximal portion of the cap and a generally tapered cylindrical body extending therefrom. Each one of the opposing split axles cooperatively engage an opposing grooved slot formed in an opposing sidewall of a first channel and a second channel parallel and spaced apart and formed in the shoe frame between a longitudinal center member and the respective first side rail and the second side rail. The roller shoe includes a plurality of roller wheels, each roller wheel formed of a material having a high friction surface, the roller wheel comprises a compressible polymer of a selected hardness. The roller wheel has a hub including a socket formed in the hub engaging the tapered cylindrical body and the flange releasably holding each of the split axles in position within the socket, the split axles being press fit in the hub and snapped into a locking position permitting vertical movement of the split axles within the grooved slot of the rolling shoe frame. Each of the roller shoe assemblies comprises a snap-fit connection coupling the roller shoe and the carrier together. The snap-fit connection has a structure which permits the roller shoe to detach from the carrier in response to an undesirable force acting on the roller shoe without damaging any part of the roller shoe assembly.

Although a carrier is described in the present application, it is anticipated that other types of carriers could be attached to the novel roller shoe upper portion described and claimed in the present invention using same as an integral shoe and carrier or utilizing the roller shoe with a different carrier structure. The concept of utilizing a roller shoe to support articles on top of the shoe and move the articles at a higher speed from the center of the conveyor toward the edges is unique with respect to the instant apparatus.

In another aspect of the disclosure a sorter conveyor apparatus includes an endless upwardly facing conveying surface movable in a conveying direction. The conveying surface is defined by a plurality of surfaces separated by a plurality of slots extending in a transverse direction relative to the conveying direction. A plurality of roller shoe assemblies that each include a roller shoe disposed above the conveying surface and a carrier disposed below the conveying surface. Each of the plurality of roller shoe assemblies includes a bridge extending through at least one of the slots in the conveying surface to permit each roller shoe assembly to move in the transverse direction while also moving in the conveying direction with the conveying surface. Each of the roller shoe assemblies includes a snap-fit connection coupling the roller shoe and the carrier together. The snap-fit connection includes two connector projections that each include a hook member having a locking surface, and respective cooperating locking surfaces against which one of the hook members is engaged to retain the roller shoe and the carrier together. Each of the roller shoe assemblies further includes two drive projections, with each drive projection being received in a cooperating opening to transfer forces between the roller shoe and the carrier when the roller shoe is driven in the transverse direction without the roller shoe detaching from the carrier absent exposure to an undesirable force. The elongated roller shoe features downward slanting ends and includes a plurality of roller wheels extending above the surface of the shoe mounted to axles movable in a vertical axis whereby an article resting on the rollers of a shoe depresses the rollers so they contact the slat surface and move an article resting thereon at twice the speed of the shoe.

One preferred embodiment of a slat sorter conveyor and roller shoe apparatus, comprises or consists of an endless upwardly facing conveying surface movable in a conveying direction, the conveying surface defined by a plurality of surfaces separated by a plurality of slots extending in a transverse direction relative to the conveying direction. A plurality of roller shoe assemblies are use don the slat sorting conveyor with each roller shoe assembly comprising a roller shoe disposed above the conveying surface and a carrier disposed below the conveying surface. Each one of the plurality of the roller shoe assemblies extend through at least one of the slots in the conveying surface to permit each roller shoe assembly to move in the transverse direction while also moving in the conveying direction with the conveying surface. Each one of the roller shoe assemblies including a plurality of roller wheels, each roller wheel formed of a material having a high friction surface. The roller wheel comprises a compressible polymer of a selected hardness, the roller wheel having a hub including a socket formed in the hub engaging the tapered cylindrical body and the flange releasably holding each of the split axles in position within the socket. The split axles are press fit in the hub and snapped into a locking position permitting vertical movement of the split axles within the grooved slot of the rolling shoe frame. Each of the plurality of roller wheel assemblies comprises a snap-fit connection coupling the roller shoe and the carrier together, wherein the snap-fit connection has a structure permits the roller shoe to detach from the carrier in response to an undesirable force acting on the roller shoe without damaging any part of the roller shoe assembly, and wherein the snap-fit connection has a structure that permits the roller shoe to be fully recoupled to the carrier manually without the use of tools after being detached from the carrier.

In a further aspect of the disclosure, a sorter conveyor apparatus includes an endless upwardly facing conveying surface movable in a conveying direction. The conveying surface is defined by a plurality of surfaces separated by a plurality of slots extending in a transverse direction relative to the conveying direction. A plurality of roller shoe assemblies that each include a roller shoe disposed above the conveying surface and a carrier disposed below the conveying surface. Each of the plurality of roller shoe assemblies includes a bridge extending through at least one of the slots in the conveying surface to permit each roller shoe assembly to move in the transverse direction while also moving in the conveying direction with the conveying surface. Each of the roller shoe assemblies comprising a releasable snap-fit connection coupling the roller shoe and the carrier together. The releasable snap-fit connection includes a connector projection, and a cooperating connector member upon which the hook members engage to retain the roller shoe and the carrier together. The roller shoe assembly comprises a flexible material to bias the connector projection against the cooperating member to increase the force required to detach the roller shoe.

In yet another aspect of the disclosure, a sorter conveyor method is provided for use with an endless upwardly facing conveying surface movable in a conveying direction. The conveying surface is defined by a plurality of surfaces separated by a plurality of slots extending in a transverse direction relative to the conveying direction. The method includes providing a plurality of roller shoe assemblies, with each roller shoe assembly including a roller shoe disposed above the conveying surface and a carrier disposed below the conveying surface. Each of the plurality of roller shoe assemblies extends through at least one of the slots in the conveying surface. The method can include coupling the roller shoe and the carrier together using a snap-fit connection; and causing at least some of the roller shoe assemblies to move in the transverse direction while also moving in the conveying direction with the conveying surface; Upon exposure to an undesirable force acting upon the roller shoe, the roller shoe automatically detaches from the carrier at the snap-fit connection without damaging any part of the roller shoe assembly, including the snap-fit connection. After such detaching, the method includes fully reattaching the roller shoe to the carrier manually without the use of tools using the undamaged roller shoe, including the undamaged snap-fit connection.

The present invention provides an endless upwardly facing conveying surface movable in a conveying direction, wherein the conveying surface can be defined by a plurality of surfaces separated by a plurality of slots extending in a transverse direction relative to the conveying direction. The methods can include disposing a roller shoe above the conveying surface and disposing a carrier below the conveying surface and coupling the roller shoe and the carrier together to form a roller shoe assembly. The disposing and coupling steps can be repeated to form a plurality of roller shoe assemblies with each roller shoe assembly extending through one of the slots in the conveying surface to permit each roller shoe assembly to move in the transverse direction while also moving in the conveying direction with the conveying surface.

A roller shoe slat sorter conveyor system includes a conveyor forming an upwardly facing support surface. The support surface includes slots oriented transversely to the conveying direction and a plurality of roller shoe assemblies mounted for sliding movement along respective slots for transversely discharging objects from a medial position to either side of the conveying surface. Each roller shoe assembly includes a releasably mounted carrier disposed below the conveying surface. The releasable connection enables the roller shoe to detach from the carrier, and be manually reattached. The elongated roller shoe features downward slanting ends and includes a plurality of roller wheels extending above the surface of the shoe mounted to axles movable in a vertical axis whereby an article resting on the rollers of a shoe depresses the rollers so they contact the slat surface and move an article resting thereon at twice the speed of the shoe.

It is an object of the present invention for the frame to support the roller shoe rather than the axle disposed in a vertical slot for floating up and down having limited movement in horizontal direction;

It is an object of the present invention for the wheel to roll on top of a slat whereby the source of traction to create acceleration in the left to right direction is function of roller wheel on top of the slat when weight is placed on the axle and transferred to the roller wheel.

It is an object of the present invention to provide a roller shoe removably mounting to a carrier via a snap fit with hook projections cooperatively engaging slots formed in the roller shoe and a roller shoe carrier having a pin and guide wheel in cooperative engagement with a slot formed in a slat conveyor.

It is an object of the present invention for the roller shoe carrier to include a pin and guide wheel in flow communication with a track in the slat conveyor.

It is an object of the present invention for the carrier to rest on the slat and the weight of the object or package setting on the roller shoe to depress the rolling wheel axle within the axle slot allowing vertical travel thereof and so the rolling wheel supports the weight of the object resting on the roller shoe.

It is an object of the present invention to form the roller wheels in from a flexible material such as urethane having an selected durometer hardness (A-D) and preferably A and an axle of NYLON or other harder material such as a graphite, metal, or combinations thereof.

It is an object of the present invention with urethane roller wheels shaped having a hub with a wide rim and track, a narrow wheel portion and wide hub to accommodate the axle promoting flexing of the rolling wheel and traction with the slat surface.

It is an object of the present invention to include means for the roller shoe to removably mount to the carrier in order for it to pop off upon reaching a predetermined amount of force in order not to jam the slat conveyor or damage the carrier mechanism.

It is an object of the present invention to utilized a split axle with spindles extending from the hub on each side of the roller wheel, whereby the distal ends of the axles are pushed into vertical slots in the sidewalls of the roller shoe channels formed of an elastic flexible material and retained by clips or spring loaded snaps, whereby the axles are squeezed in position to be held by the resilient material in the vertical slot retaining the roller wheel in a spring loaded position.

It is an object of the present invention to provide roller wheels having an outer surface of compressible material.

It is an object of the present invention to provide a roller shoe having a downward sloped front end, a downward sloped back end, and/or a downward sloped front and back end so article pops up onto roller shoe if it bumps into an object in front to resist a scissoring action binding roller shoes up and be able to run with smaller gaps between roller shoes for greater capacity as opposed to conventional roller shoe sorters having pushers to move material in front of the roller shoe whereby it can bind up when an roller shoe pushing an article which overlap and bump into a forward roller shoe in cross-over.

It is an object of the present invention for the roller wheels to roll twice as fast as the carrier/roller shoe speed so that packages which are supported on the roller wheels advance forward and all off in front of the roller shoe whereby they are pushed off of the slat conveyor.

It is an object of the present invention for the weight of the object on top of the roller shoe to be sufficient to create enough gravity force to push the roller wheel axles down in the vertical axle slot thereby pushing the roller wheel below the roller shoe frame and lifting the frame above the slat surface whereby the object thereon support by the roller wheels travels at 2× the speed of the roller shoe.

It is an object of the present invention for the roller shoe sorter to be able to move short and long articles up against one another whereas competitors using conventional pushers have fixed cell sizes "compartments" limiting capacity.

It is an object of the present invention for the roller shoe to be positioned on the slats in order to push the package form a generally medial position to the left or right as needed.

It is an object of the present invention to use photo electric eyes or other sensors to determine the position of a package on the slat conveyor whereby at least one roller shoe can be pre-positioned on the slat and a switch will preposition the roller shoe on one side or the other of It is an object of the present invention for the object supported by the roller wheels to move at 2× velocity of the roller shoe for moving the article on top of roller shoe forward an off in front of the roller shoe, to eliminate cross-overs and allow take off chutes alternating left side and right side and to divert as many roller shoes as necessary including moving several roller shoes moved in sequence and/or in turn to move the package if necessary;

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 37A shows how a box in front of the shoe can be pushed by both the ramp to help slide the package, or the package can make contact with the wheel and be rolled off of the shoe;

FIG. 37B shows how a box in front of the shoe can be pushed by both the ramp to help slide the package, or the package can make contact with the wheel and be rolled off of the shoe;

FIG. 37C shows how a box in front of the shoe can be pushed by both the ramp to help slide the package, or the package can make contact with the wheel and be rolled off of the shoe;

FIG. 37D shows how a box in front of the shoe can be pushed by both the ramp to help slide the package, or the package can make contact with the wheel and be rolled off of the shoe;

DETAILED DESCRIPTION OF THE PREFERRED EMBODIMENT

Figure 1:
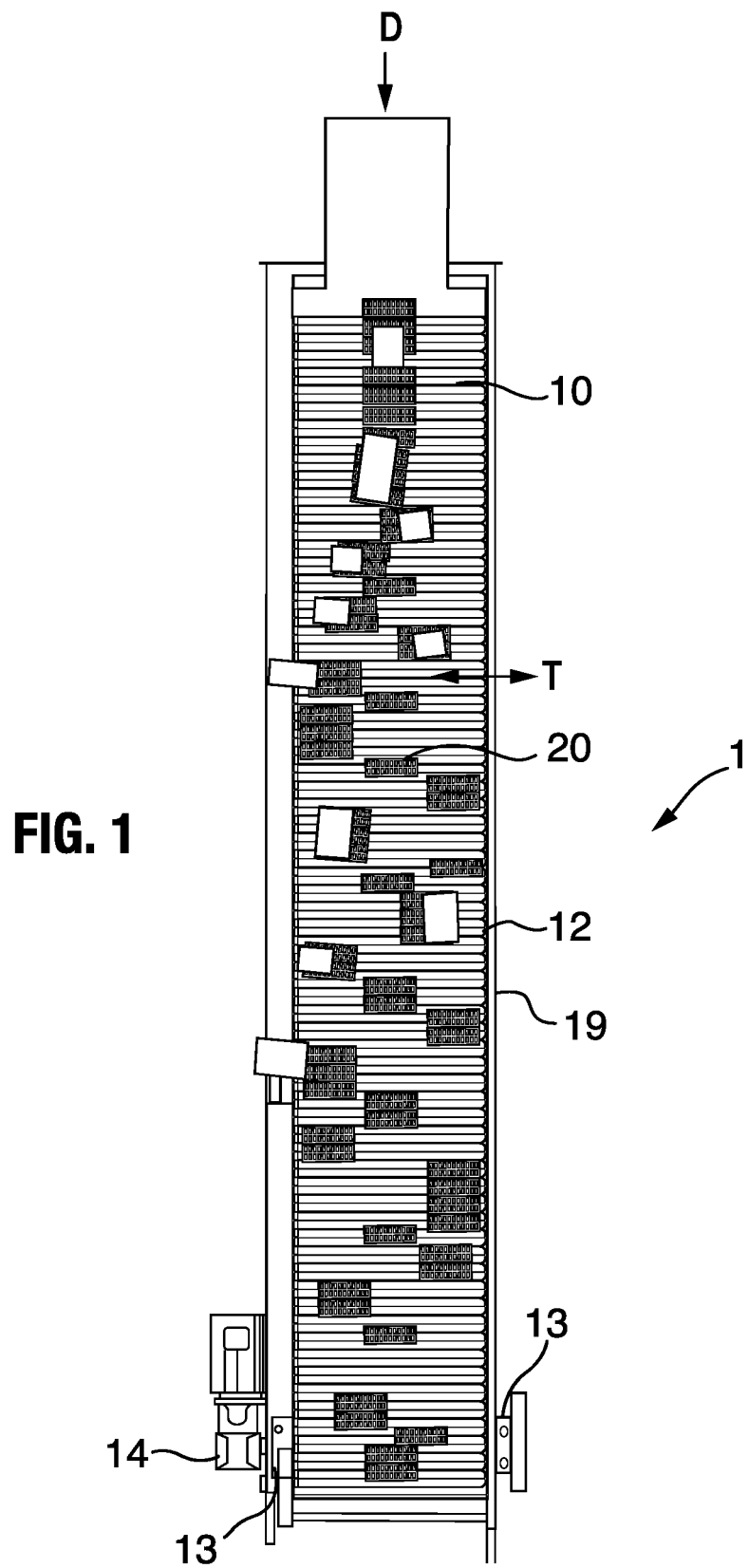
FIG. 1 is a top view of the slat conveyor showing conveyance of packages diverted to either side of the conveyor on roller shoes.
Figure 2:
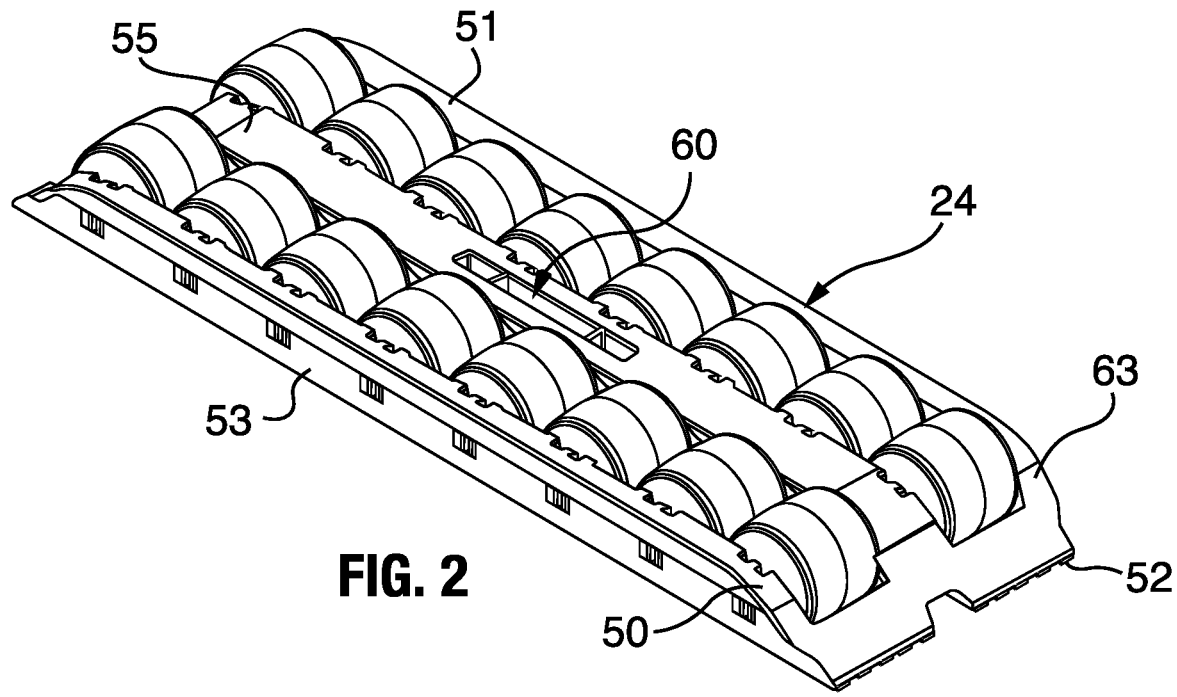
FIG. 2 is an isometric view of a roller shoe sorter.

The application incorporates by reference U.S. Pat. Nos. 8,602,201 and 8,727,097 by Ydoate et al. assigned to Applicant in its entirety.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. As used herein, the term "about" can be reasonably appreciated by a person skilled in the art to denote somewhat above or somewhat below the stated numerical value, to within a range of ±10%.

The method steps, processes, and operations described herein are not to be construed as necessarily requiring their performance in the particular order discussed or illustrated, unless specifically identified as an order of performance. It is also to be understood that additional or alternative steps disclosed herein may be employed in any of the various embodiments discussed herein, regardless of whether such additional or alternative step is expressly disclosed for use in a particular embodiment herein.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As depicted in FIG. 1 is an exemplary roller shoe sorter 1 comprising an endless slat sorting conveyor, "slat conveyor" 1 for conducting objects A in a conveying direction D past destination sites. The slat conveyor 1 includes an upwardly facing support surface on which the objects are disposed. The support surface can be formed by support rails 15 which are connected to roller chain strands 12 driven in the conveying direction D by any suitable drive mechanism, such as sprockets 13 driven by a motor 14.

As shown in FIGS. 2-22, the roller shoe base 52 defines a ladder assembly sliding along the support rail. As seen in the drawings, it is not necessary that the frame 50 completely enclose the base 52. The frame 50 pushes or carries objects such as parcels, packages, or objects A over the sorter slat conveyor. The roller shoe frame 50 and base 52 can be formed of a metal such as aluminum, fiberglass, a graphite material or preferably a thermoplastic elastomeric material, such as SANTOPRENE.R™. 201-64, and the base 52 can be preferably formed of a stiffer material, such as a polyoxymethylene.

The roller shoe frame 50 comprises a pair of longitudinal spaced apart members defining a first side rail 51 and second side rail 53 connected by at least one and preferably a pair of opposing downward sloped end portions defining ramps 63 on opposing ends of the frame 50. The ramps 63 contact and push conveyed objects and/or create a ramp for objects to move up and onto the roller shoe body to be carried thereby. The opposing end portions 63 are joined at the center by a longitudinal center member 55 disposed equal distance between the first side rail 51 and second side rail 53. In a preferred embodiment the shoe frame first side rail 51, second side rail 53, center member 55 and end members 63 are formed as an integral unit. The base 52 may be formed integrally with the frame 50 or attached thereto by a friction fit, welding, adhesives, snap fit, fastening means such as screws or other means. The base 52 may be formed of the same or different material than the shoe frame, but is typically a more rigid and stiff material having a low friction surface. The base 52 includes a pair of longitudinal feet or ribbed runners 64 whose end edges 65 are slidable within respective grooves 69 formed by hook-shaped portions 61 of the rail 15 that extend in the direction T. In a preferred embodiment, the roller shoe 24 rests directly on the tops of the hook-shaped portions which cooperatively fit together defining the support surface of the slat conveyor.

In each application, the shoe can be a selected length for optimizing the width and length of the conveyor. For instance, a 14 inch roller shoe defining a ladder assembly can be positioned in the middle of the slat conveyor and be mounted in a scissor proof design with small gaps therebetween. Every 14 inch interval on the conveyor can have a ladder shoe assembly, so that the ladder shoe moves in a series, forming a wave of shoes across the conveyor, Instead of pre-positioning the shoe, objects such as boxes loaded onto the slat conveyor can be loaded on top of the shoes. The shoe is designed having a ramp to abut and left objects up and onto the shoe for transverse transport across the slat conveyor and/or the shoe will pop-off the drive projections and connectors separating the top from the bottom portion of the shoe if over-loaded to prevent jamming and damage. Typically the shoes are mounted to the slat conveyor in the middle in order to divert to either side of the conveyor. Objects such as boxes which abut the shoe ramp and which slide up onto the top of the shoe move twice the velocity of the shoe.

A point of novelty with the present shoe invention is that the main purpose of the ramp at the front of the shoe is not to "PUSH" the object across the slat conveyor, but for the ramp to slide under the object lifting the object onto the top of the shoe for faster 2× transverse conveyance of the object across the slat conveyor. It should be noted that the increased speed of the shoe can be varied according to the size of the wheels used on the shoe to carry the objects. Objects supported by the roller shoe are transported rest on the top of the shoe rollers and not the shoe frame during transverse transport.

The objects supported on top of the shoe wheels move at 2× the speed of objects being pushed with the shoe. Adjustment of the speed can be accomplished by changing the height of the shoe or diameter of the wheel. The ability to carry objects on top of the shoes at an increased speed enables the slat conveyor to provide cross over capabilities without having to move the shoes from one edge of the slat conveyor to the other crossing over in the same manner as conventional conveyors. The shoes are positioned in middle of the slat conveyor, and need not be pre-positioned on the edges. The shoes move from the middle to either side to accept or objects for loading. If articles fall between the shoes, potentially jamming them, the ramp on the shoe contacts the object and bumps it up and onto the top of a shoe allowing faster rates and resistance to jamming yielding created capacity and higher density of packages conveyed without crossover failure and damages conveyors. The straight rail of the shoe prevents scissor action of the adjacent shoes.

As shown in figures, each roller wheel is removably mounted on an axle (comprising a pair of opposing split axles), each one having an outer cap with a circumferential flange extending around the proximal portion of the cap and a generally tapered cylindrical body extending there from. The axle is formed of a polymer such as NYLON, but could comprise a metal such as aluminum, stainless steel, brass, graphite composite, or combination thereof. The opposing axles are positioned above and in alignment with opposing grooved slots formed in opposing sidewalls of a first channel 57 and a second channel 59 parallel and spaced apart formed in the shoe frame 50 between the longitudinal center member and the respective first and second side rails 51, 53 from the distal end portions 63.

A slat sorter roller shoe utilizes a frame and more particularly, a ladder frame 19 including a first side rail 51 and second side rail 52 connected by opposing downward sloped end portions defining ramps. The opposing end portions join by a longitudinal center member disposed equal distance between the first side rail and second side rail. The frame includes a base comprising a pair of longitudinal ribbed runners having end edges in cooperative engagement and in a slidable relationship with the slat. The frame includes a recess at a selected location in the center member for receiving a plurality of drive projections extending upward from a top of the carrier. Each one of the roller wheels is removably mounted on an axle comprising a pair of opposing split axles, each one having an outer cap with a circumferential flange extending around the proximal portion of the cap and a generally tapered cylindrical body extending therefrom. Each one of the opposing split axles cooperatively engage an opposing grooved slot formed in an opposing sidewall of a first channel and a second channel parallel and spaced apart and formed in the shoe frame between a longitudinal center member and the respective first side rail and the second side rail. The roller shoe includes a plurality of roller wheels, each roller wheel formed of a material having a high friction surface, the roller wheel comprises a compressible polymer of a selected hardness. The roller wheel has a hub including a socket formed in the hub engaging the tapered cylindrical body and the flange releasably holding each of the split axles in position within the socket, the split axles being press fit in the hub and snapped into a locking position permitting vertical movement of the split axles within the grooved slot of the rolling shoe frame. Each of the roller shoe assemblies comprises a snap-fit connection coupling the roller shoe and the carrier together. The snap-fit connection has a structure which permits the roller shoe to detach from the carrier in response to an undesirable force acting on the roller shoe without damaging any part of the roller shoe assembly.

Figure 3:
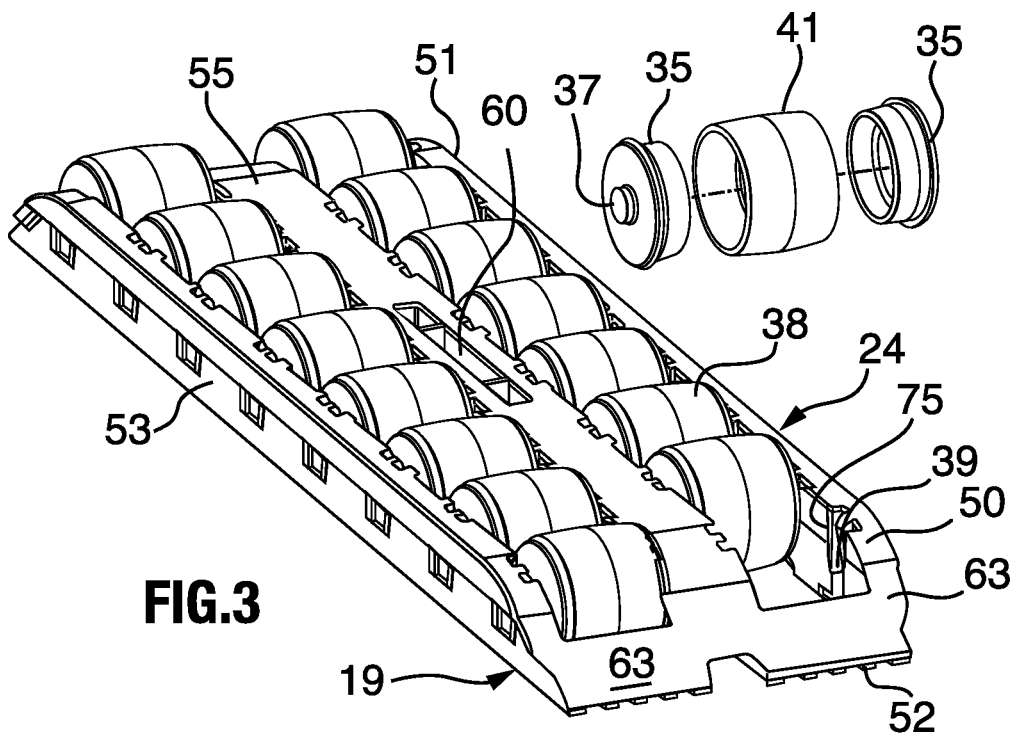
FIG. 3 is an isometric view of the roller shoe sorter of FIG. 2 showing a roller wheel having a split axle positioned above and in alignment opposing grooves formed in opposing sidewalls of a longitudinal channel formed in a shoe carriage for the wheels to move up and down in the slot and showing a removable wheel and hub.
Figure 4A:
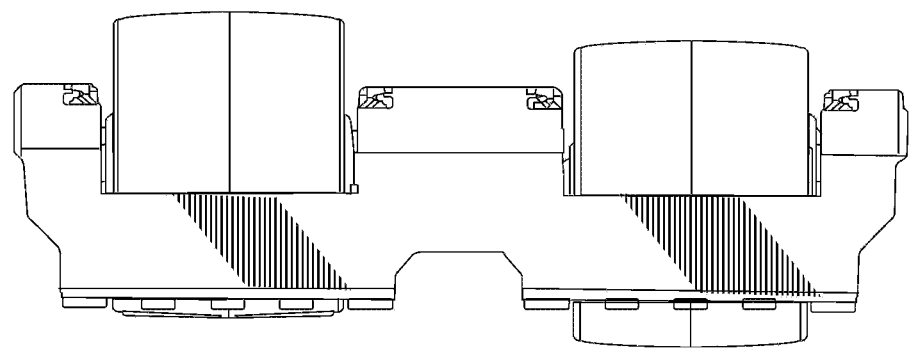
FIG. 4A is an end view of the roller shoe sorter of FIG. 2 supported by the carriage showing the wheel on the right can float in the channel higher than the normally located wheel.
Figure 4B:
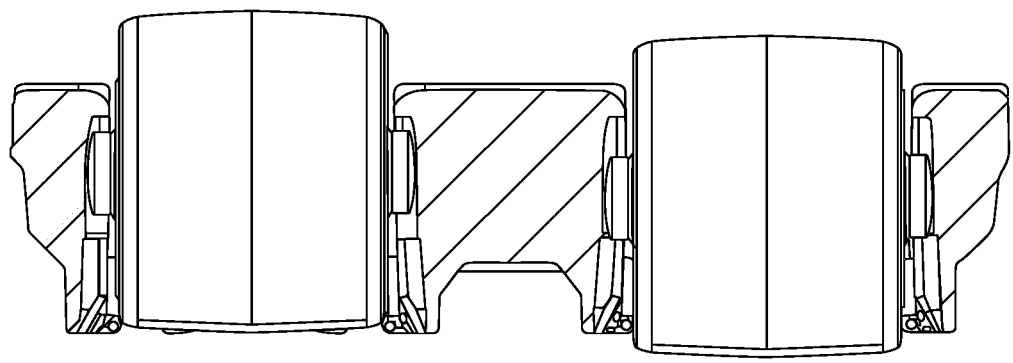
FIG. 4B is a sectional view of the roller shoe sorter of FIG. 2 supported by the carriage showing the wheel on the right can float in the channel higher than the normally located wheel.
Figure 5:
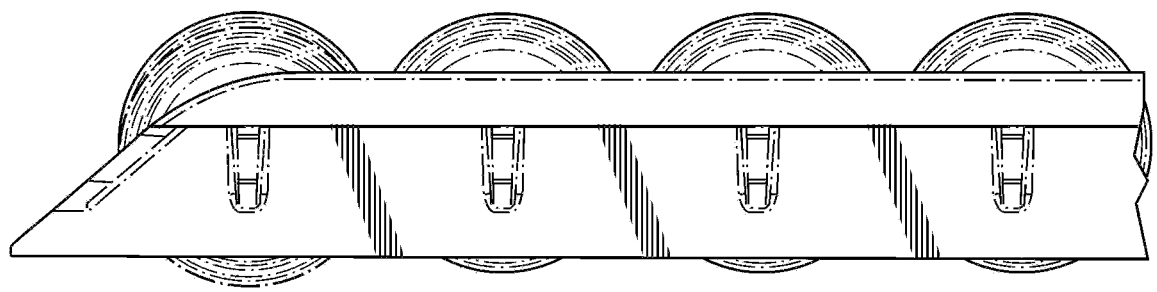
FIG. 5 is a side view of FIGS. 4A and 4B showing the carriage and rollers disposed therein showing the roller axles floating in the grooves of the carriage sidewall with the wheel on the right floating in the channel higher than a normally located wheel.
Figure 6A:
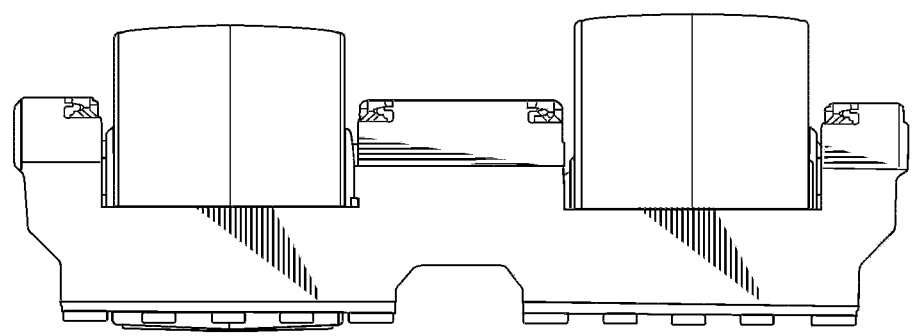
FIG. 6A is an end view of the roller shoe sorter of FIG. 2 supported by the carriage showing the wheel on the right can float in the channel lower than the normally located wheel.
Figure 6B:
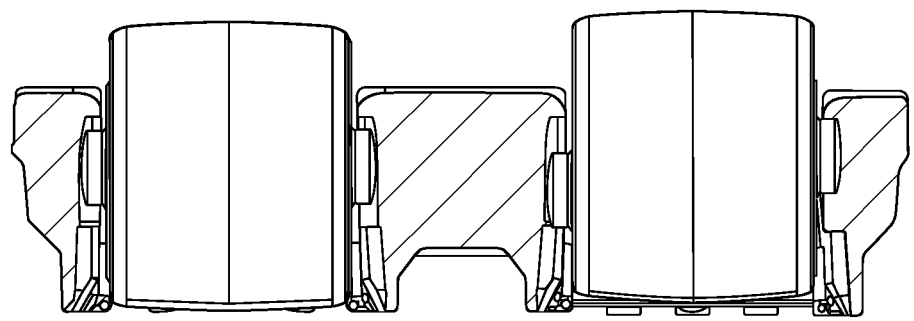
FIG. 6B is a sectional view of the roller shoe sorter of FIG. 2 supported by the carriage showing the wheel on the right can float in the channel lower than the normally located wheel.
Figure 7:
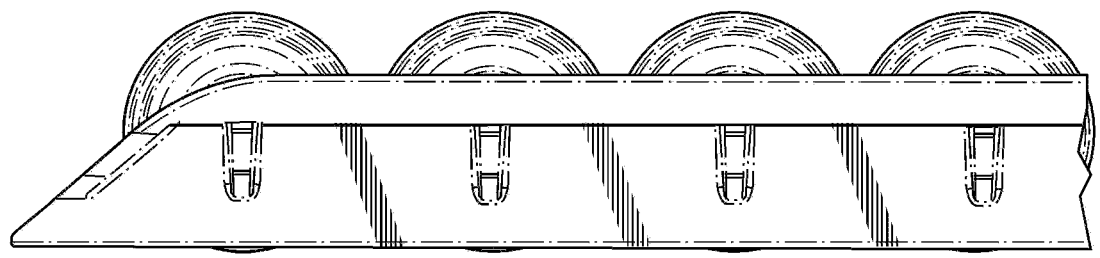
FIG. 7 is a side view of FIGS. 6A and 6B showing the carriage and rollers disposed therein showing the roller axles floating in the grooves of the carriage sidewall with the wheel on the right floating in the channel lower than a normally located wheel.
Figure 8:
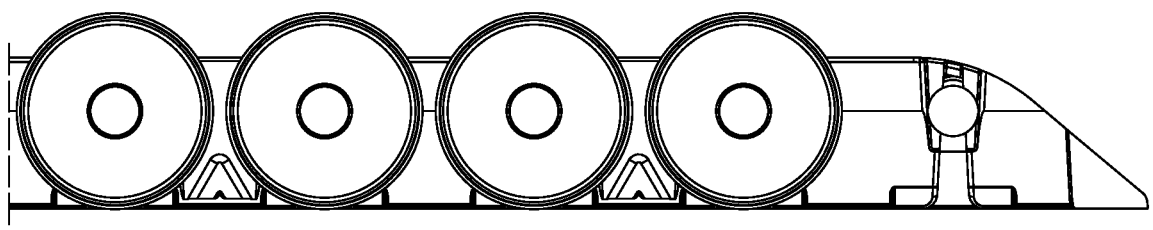
FIG. 8 is a sectional side view showing the roller wheel mounted on the rolling shoe and a NYLON axle defining a pin disposed in a parabolic shaped vertical slot formed in the side wall of the shoe held in position by a tab or projection for press-fit insertion of the axle.
Figure 9:
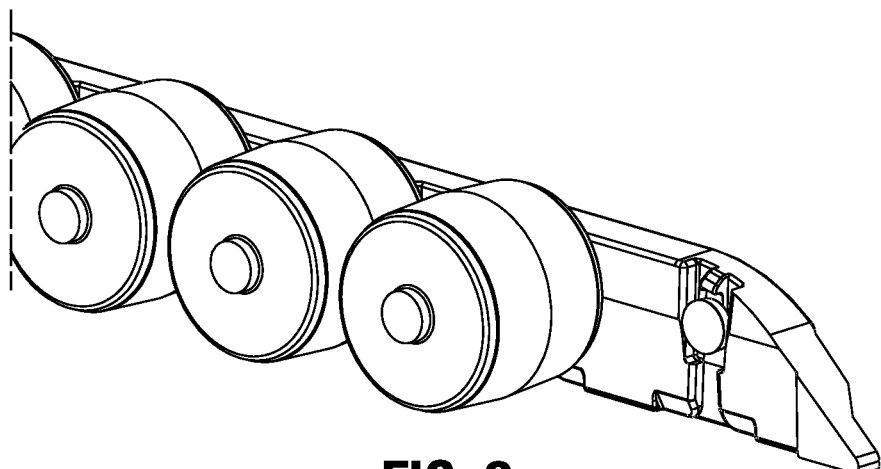
FIG. 9 is an isometric view of FIG. 8 showing the roller wheel mounted on the rolling shoe and a NYLON axle defining a pin disposed in a parabolic shaped vertical slot formed in the side wall of the shoe held in position by a tab or projection for press-fit insertion of the axle.
Figure 10:
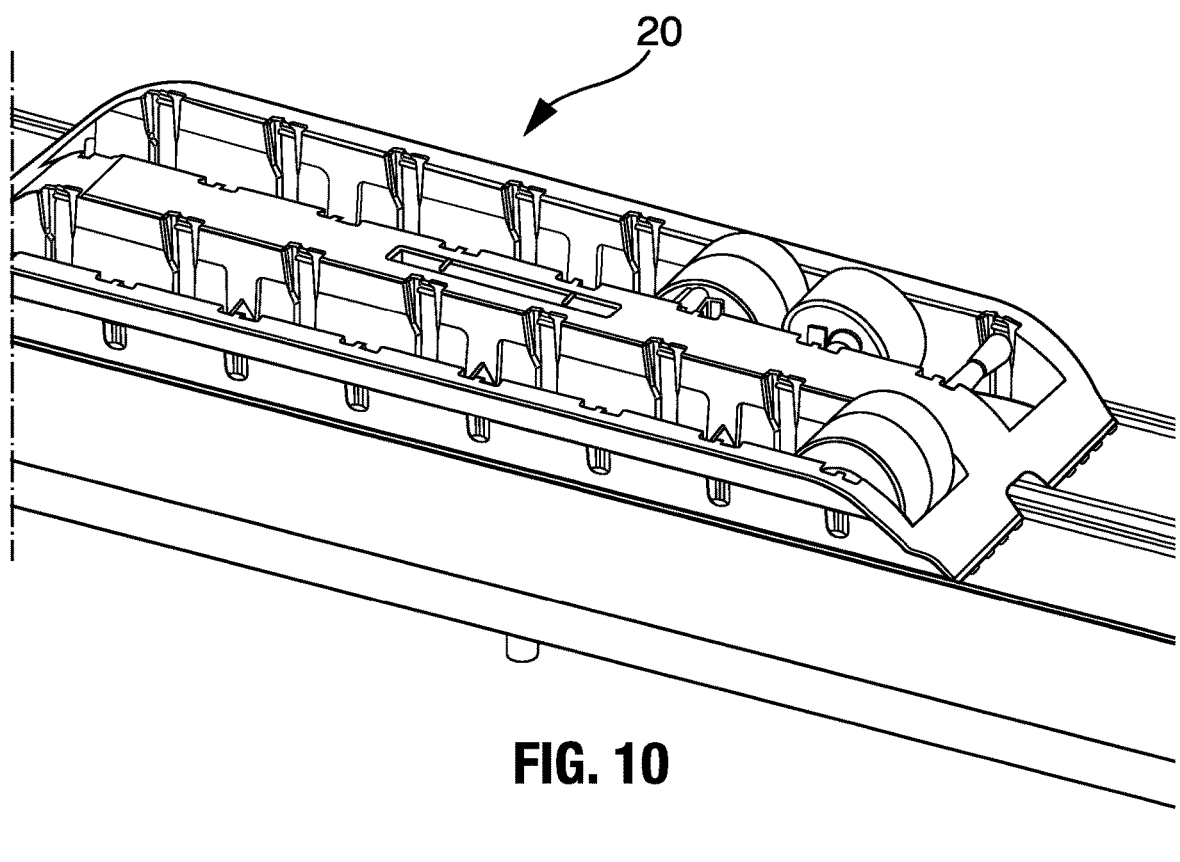
FIG. 10 is an isometric sectional side view of a roller shoe slidably mounted on a support rail showing an axle defining a pin disposed in a vertical mounting slot and roller wheels supported on the axles and the end ramp extending from the shoe carrier mounted onto a slat having ridges along the outer edges of the shoe.
Figure 11A:
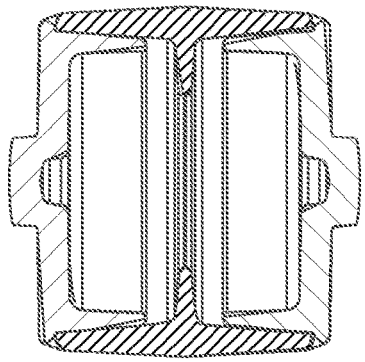
FIG. 11A shows a cross-section of the wheel assembly with the hubs and tire.
Figure 11B:
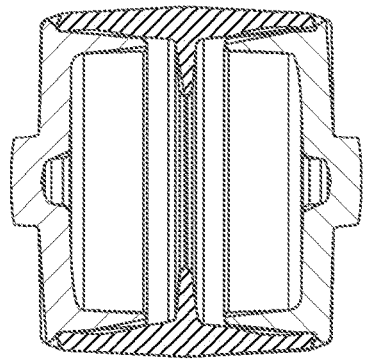
FIG. 11B shows the hubs pressing towards the center of the wheel as the tire flexes.
Figure 12:
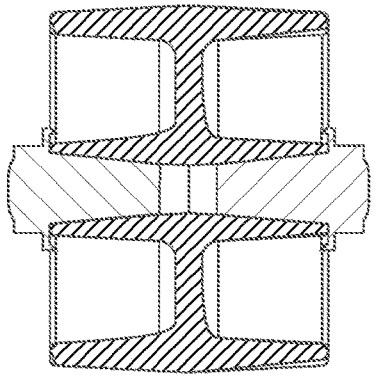
FIG. 12 is a top sectional view of a wheel assembly with pins and tires where the split axles press fit in the urethane roller wheel hub wherein the axle flange extends into the flexible cavity of the urethane roller where it is snapped into a locking position for vertical movement within the shoe mounting slots.
Figure 13:
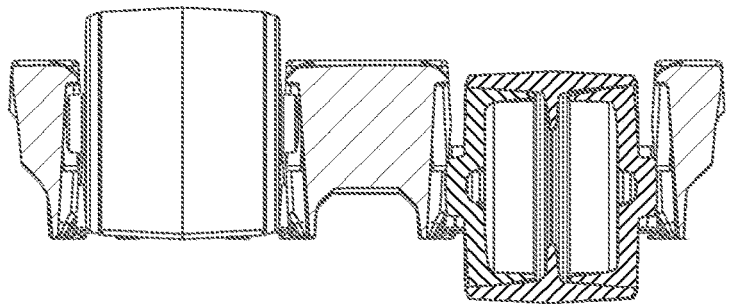
FIG. 13 shows the wheel can be installed from the bottom of the shoe cage.
Figure 14:
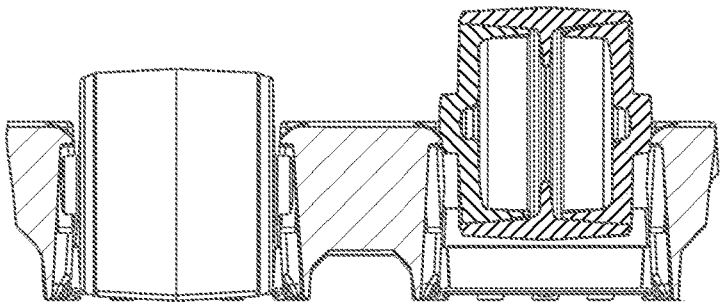
FIG. 14 shows the wheel can be installed from the top of the shoe cage.
Figure 15:
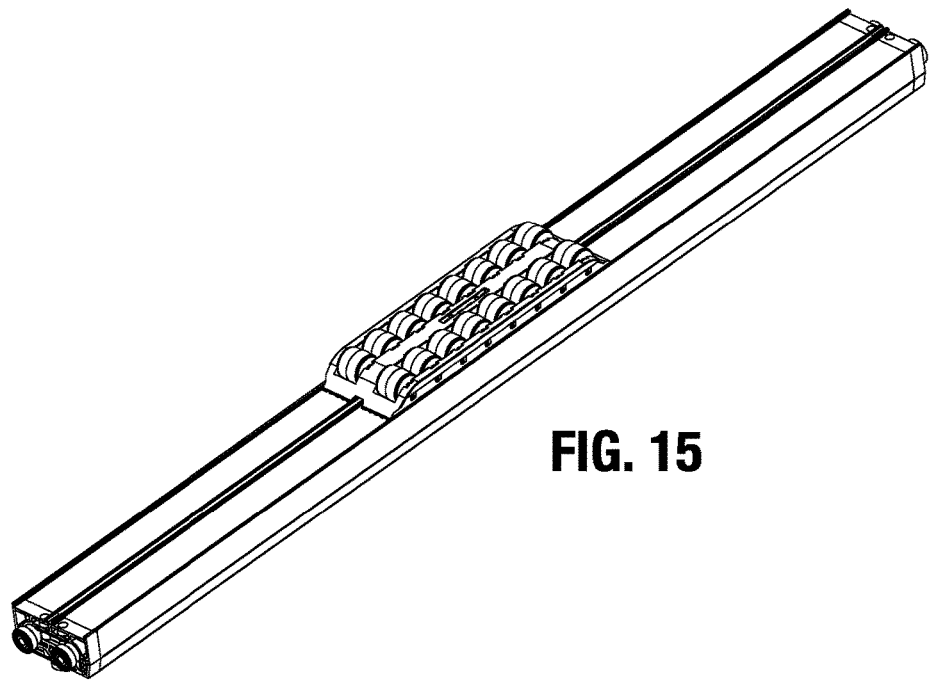
FIG. 15 is a isometric view of a section of the slat conveyor showing the slot extending between the rail support surface and a rolling shoe slidably mounted thereon.
Figure 16:
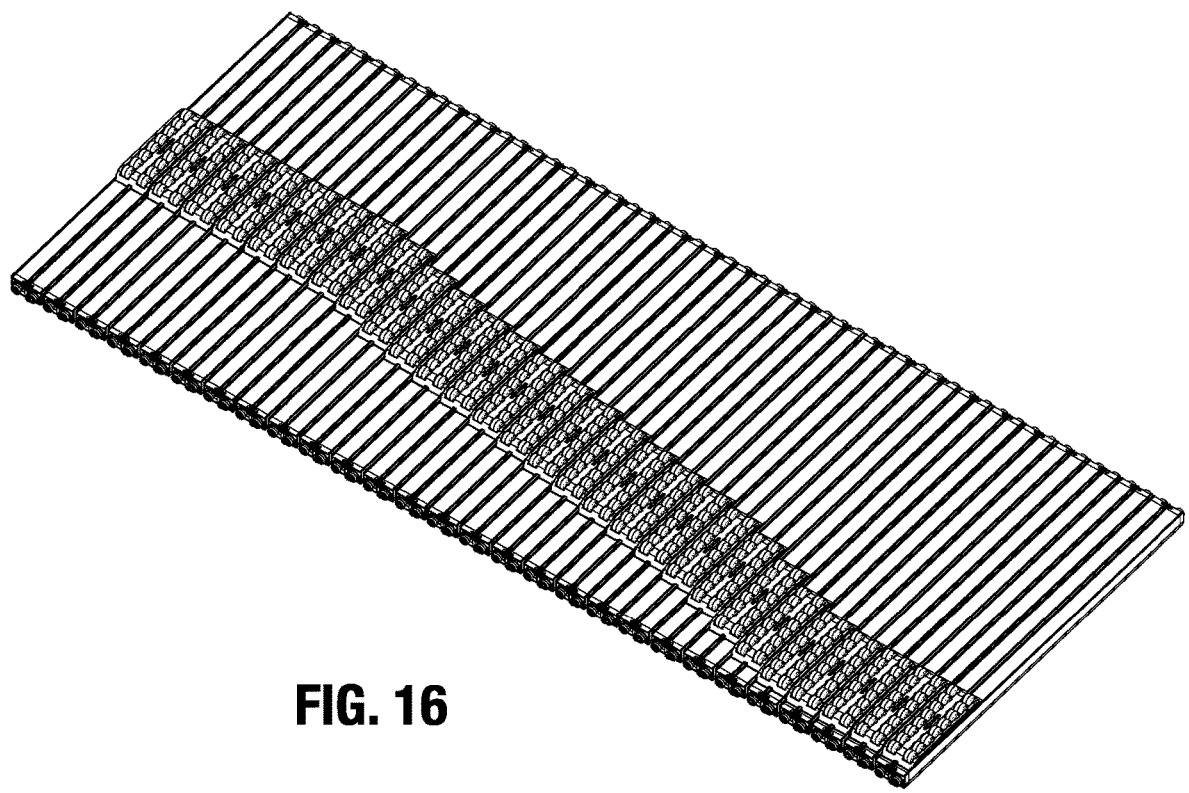
FIG. 16 is a isometric view of the slat conveyor showing a plurality of rolling shoes in a staggered formation with the slats extending from side to side.
Figure 17:
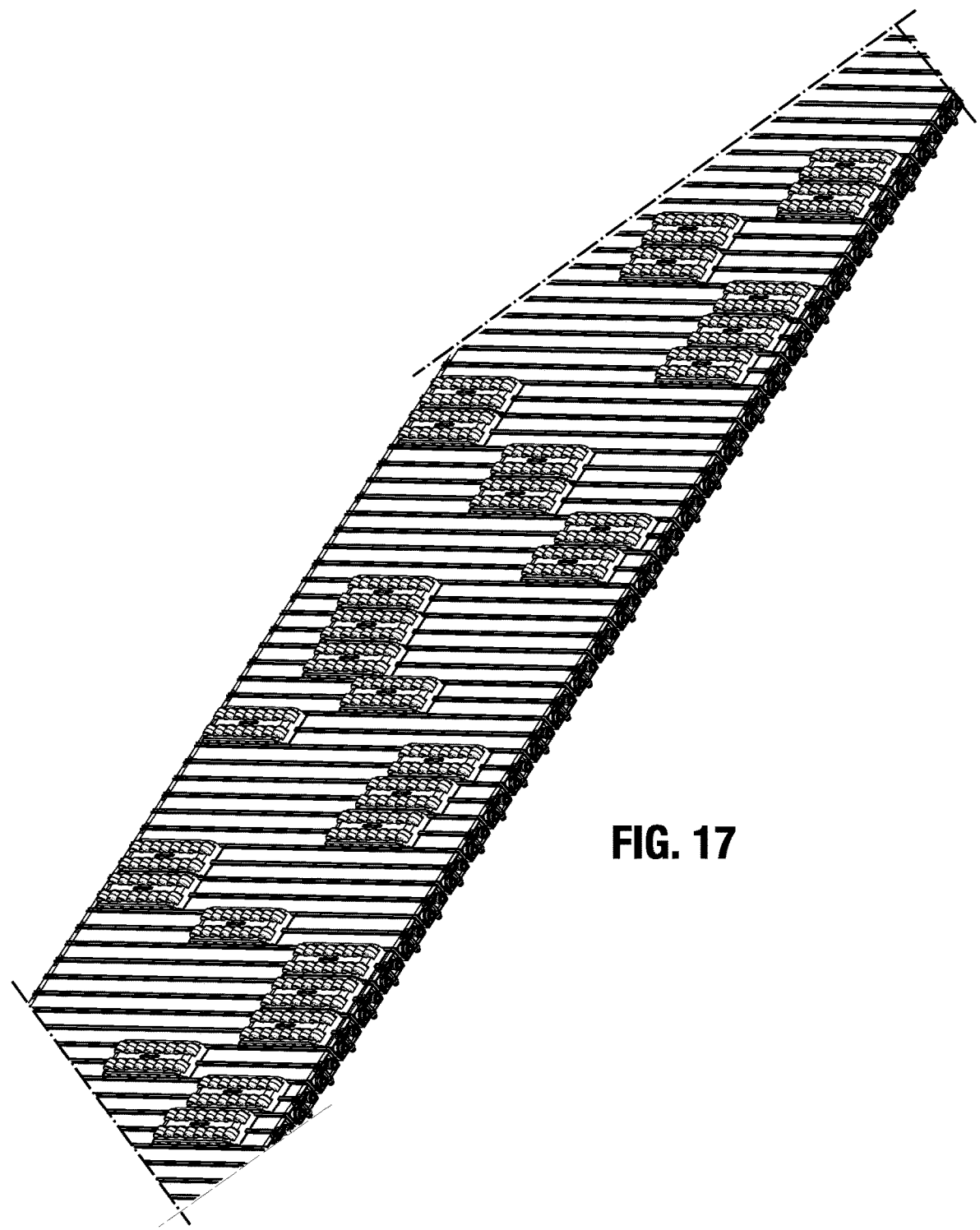
FIG. 17 is a perspective view of a section of the slat conveyor having a plurality of roller shoes mounted thereon in a staggered formation.
Figure 18:
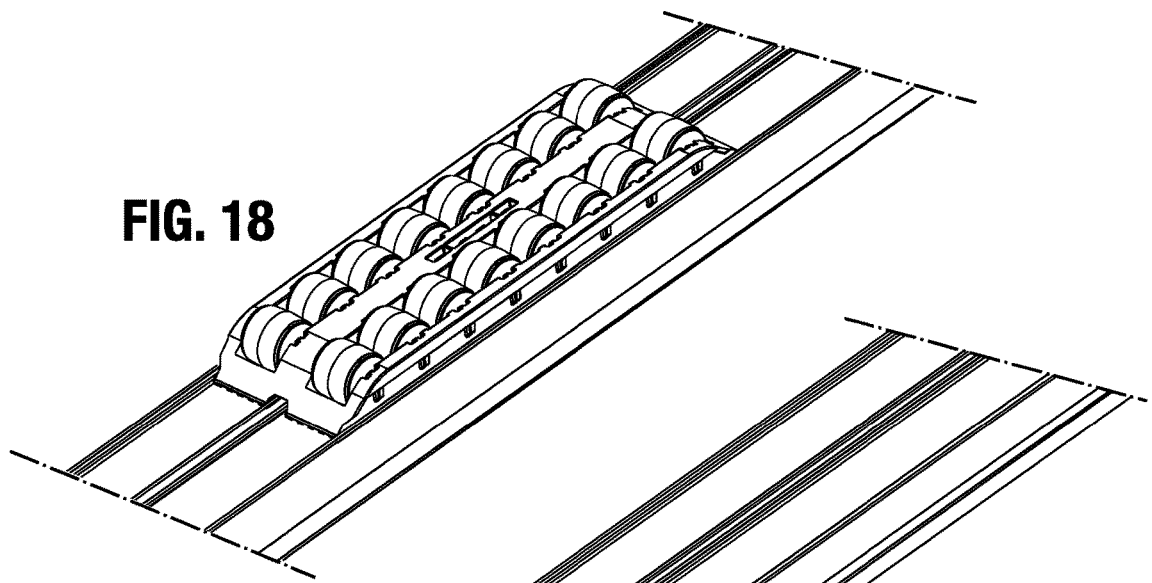
FIG. 18 is a perspective view of a section of the slat conveyor having a roller shoes mounted thereon showing the shoes with a sloped or angled front end and the shoe base comprising a plurality of longitudinal runners or ribs to reduce friction with the surface of the slats.
Figure 19:
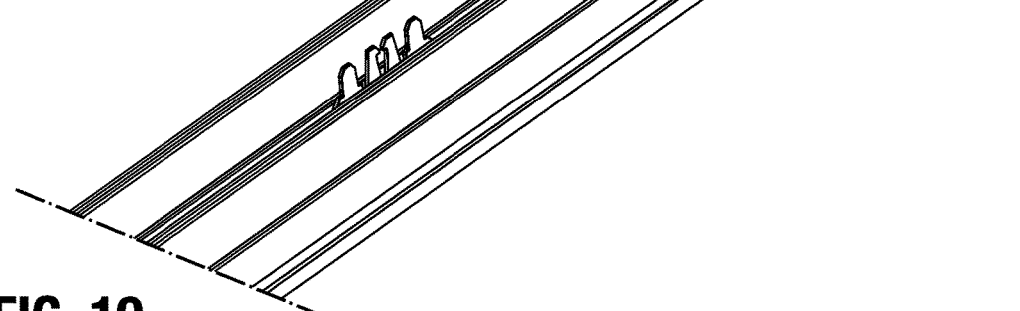
FIG. 19 is a perspective view of the carrier prongs or hooks extending through slots in the slats.
Figure 20:
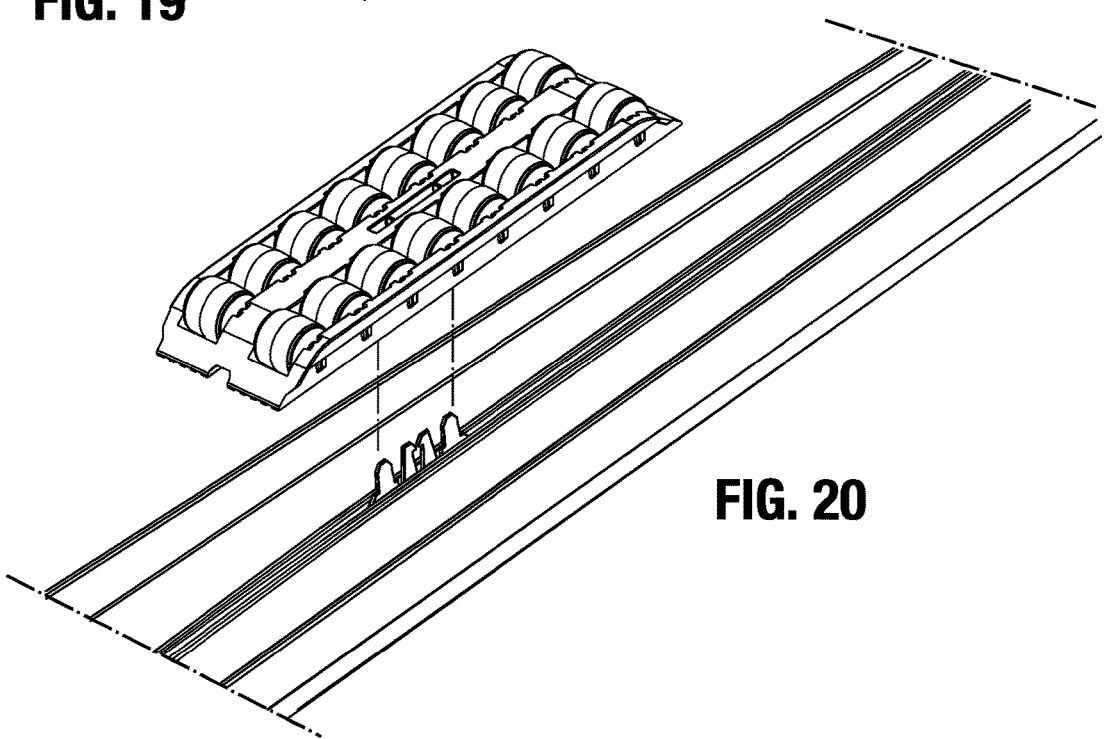
FIG. 20 is a perspective view showing a rolling shoe removed from the carrier prongs showing the slots in the center of the shoe for cooperatively engaging the prongs of the carrier extending through the slat slots.
Figure 21:
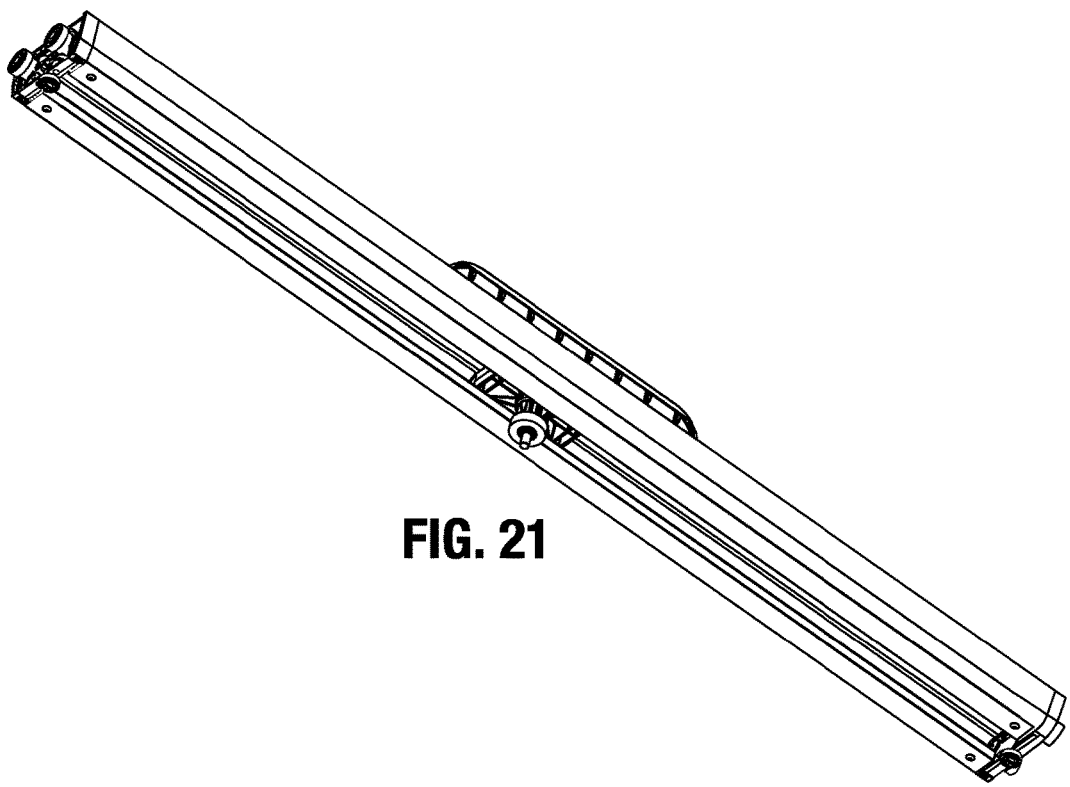
FIG. 21 is a isometric view of the pins and horizontal guide wheels extending from the bottom of the carrier held in slidable engagement with the slats.
Figure 22:
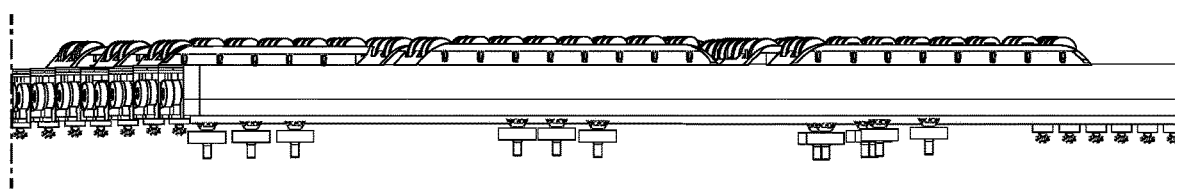
FIG. 22 shows a plurality of carrier guide wheels extending from the slat slots moving away from one end of the slat.
Figure 23:
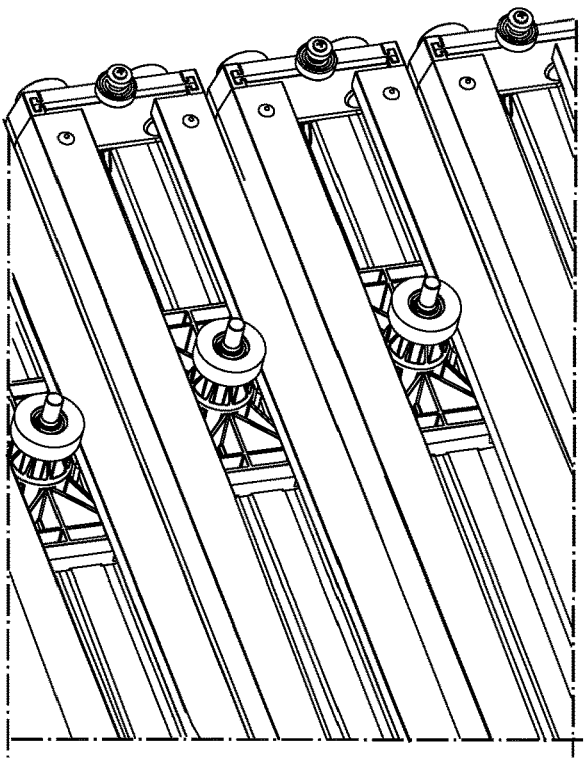
FIG. 23 is a perspective bottom view of the slat showing the upside down carrier held within horizontal grooves and the pin and guide wheel extending from the slat slot.
Figure 24:
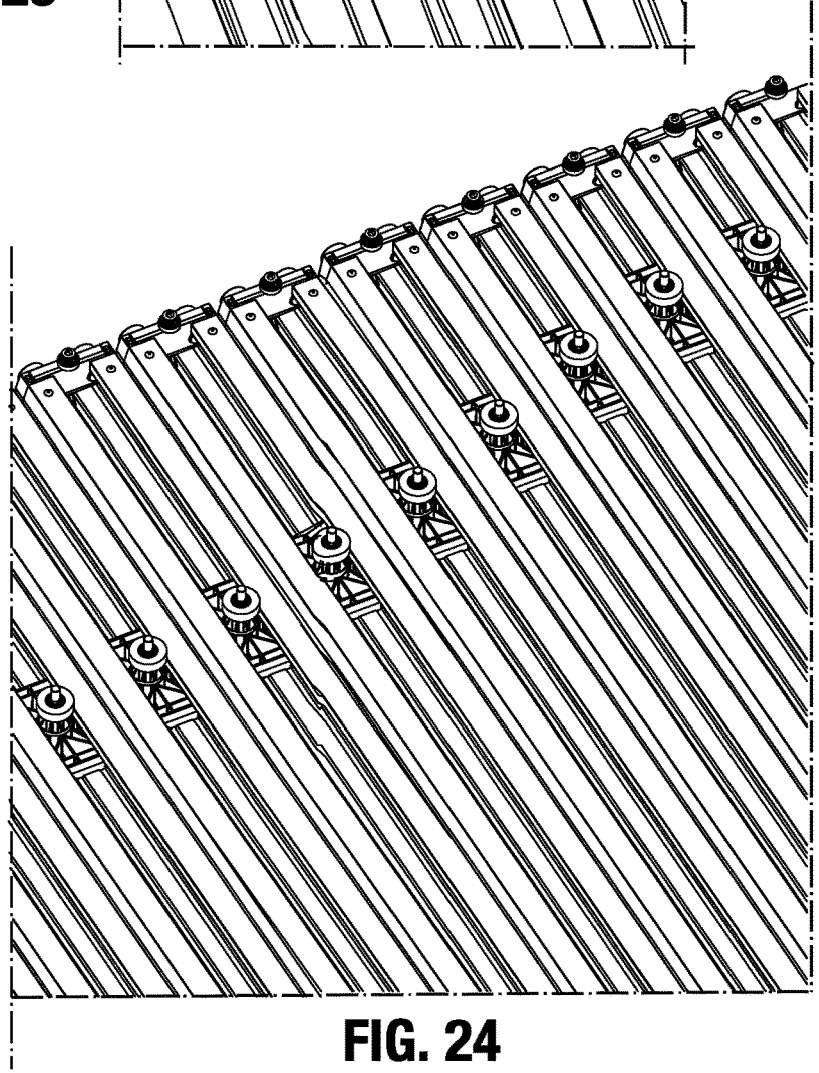
FIG. 24 is an isometric view showing a plurality of guide wheels projecting from the bottom of a slat forming a staggered wave of shoes from one end of the conveyor.
Figure 25:
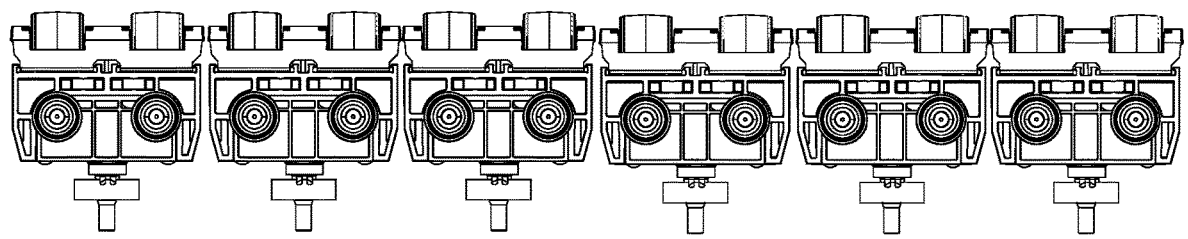
FIG. 25 is a side view of the conveyor slats showing the gear drive unit in the end of each slat section having carrier pins and guide wheels extending below the conveyor and showing the slots.
Figure 26:
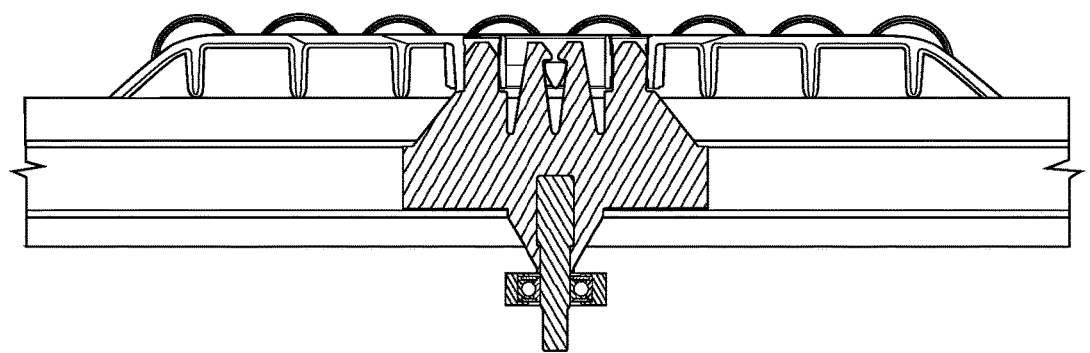
FIG. 26 is a side view of the roller shoe and on the slat conveyor showing a carrier positioned for cooperative engagement with a shoe and positioning of the projections and connectors of the carrier with respect to the slots formed in the shoe and the positioning of the pin and wheel therewith.

More particularly in one preferred embodiment, a plurality of rolling wheels 38 are disposed in a row in each one of said first channel and said second channel supported by axles extending between the split hubs 35 of each wheel 41 and the slotted grooves formed in the inner side walls of the first rail, second rail, and aligned with complementary grooved slots formed in both of the inner sidewalls of the longitudinal center member. As shown in FIG. 3 the roller wheel 38 has a split axle 37 positioned above and in alignment opposing grooves formed in opposing sidewalls of a longitudinal channel formed in a shoe carriage for the wheels to move up and down in the slot and showing a removable wheel and hub. Each grooved slot 75 is generally parabolic shaped and includes a retainer means 39 such as a flange, a projection, or clip to hold the cap or hub portion of the axle in the grooved slot allowing for limited vertical movement of the axle within the parabolic shaped grooved slot. A preferred embodiment uses a clip having resilient and deflatable prongs or tab(s) to retain the axle within the grooved slot for press-fit insertion so that the wheel, hub, and axle are removable. Moreover, the dimensions of the grooved slot require exertion of force to move the axle "cap portion" downward within the groove for limited vertical movement.

The roller wheels are formed from a flexible material such as urethane having an selected durometer hardness (A-D) and preferably A and an axle of NYLON or other harder material such as a graphite, metal, or combinations thereof. It is contemplated that the wheels could be fabricated from a metal, graphite, plastic or other synthetic material and include a high friction coating, film, tape, belt, ribbon, or belt, and/or other layer of high friction material such as urethane, rubber, or other synthetic material to enhance traction and increase load strength.

The tapered distal end portion of the split axles are press fit into the hub portion of the roller wheel composed of compressible polymer such as urethane which can be molded having 90 degree edges or rounded or angled shoulders. As shown in the figures, the axle is compressed into a socket formed in the urethane hub and the flange limits the depth of the axle and releasably holds it in position within the socket of the rolling wheel hub. The split axles press fit in the urethane roller wheel hub where it is snapped into a locking position and allows for vertical movement of the axle within the grooved slot of the rolling shoe frame.

The rolling shoe frame is mounted in cooperative engagement with projections extending through the slat slot from a carrier having a pin on the underside of the slat for engaging a track. While the roller shoes could be positioned on the sides of the slat conveyor, a preferred position is positioning the roller shoes near the center of the slat conveyor to contact packages and move them to either side of the conveyor.

As shown best in FIGS. 20-33, each support rail 15 includes a pair of horizontal portions or slats 10 that are spaced apart in the direction D to form a slot 16 extending longitudinally along the rail in a direction T transverse of the conveying direction D. Attached to each end of the support rail 15 can be a cavity defining an end insert 17 including drive gears 18 on each end of the slats disposed below the support rails.

Figure 28:
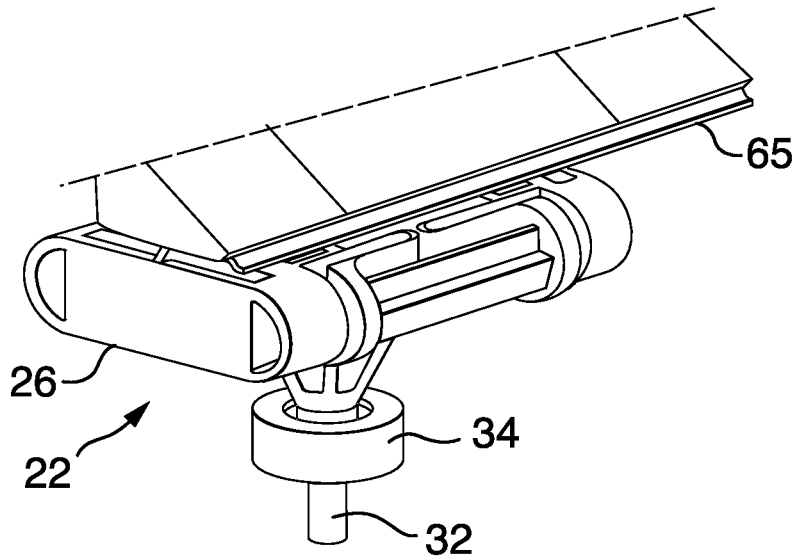
FIG. 28 shows a shoe removably mounted to a carrier having a guide wheel and pin extending therefrom.
Figure 29:
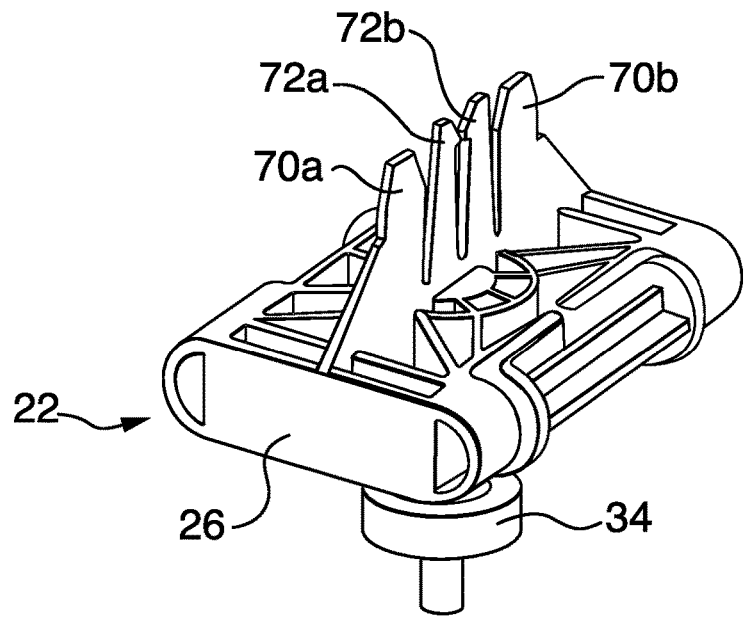
FIG. 29 is a prospective view of a carrier showing the hook projections for cooperative removable engagement with slots formed in the shoe.
Figure 30:
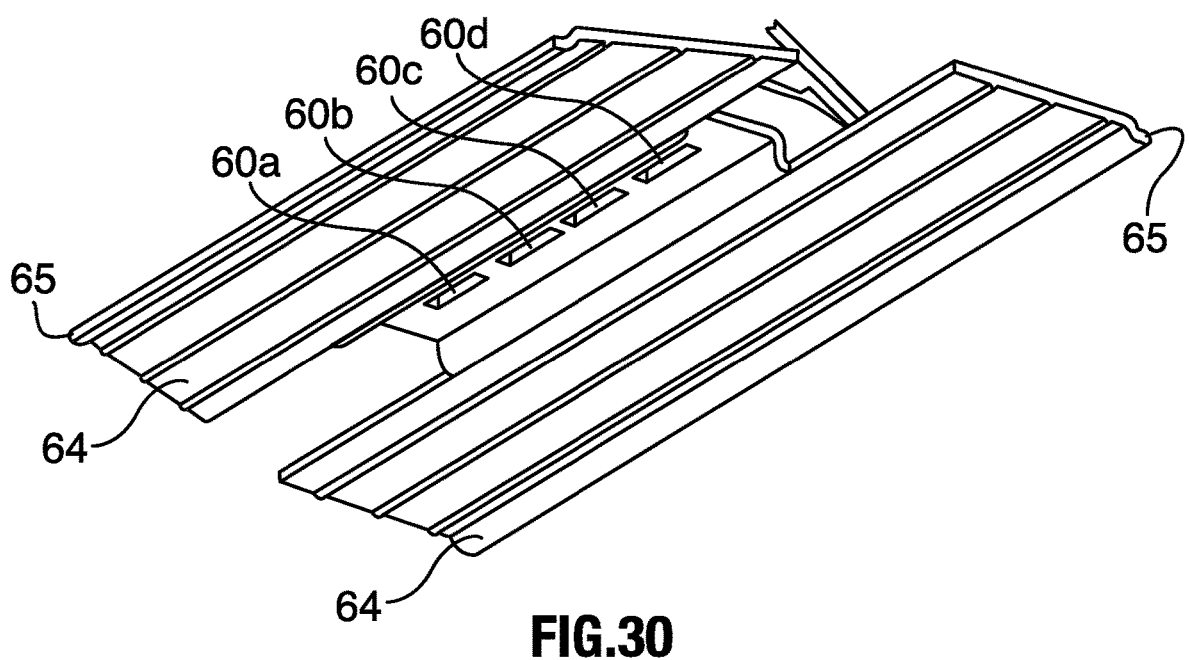
FIG. 30 is a prospective view of a roller shoe base to be supported by a slat with a frame having a medial slots for removable co-operative engagement with the hook projections shown in FIG. 29.
Figure 31:
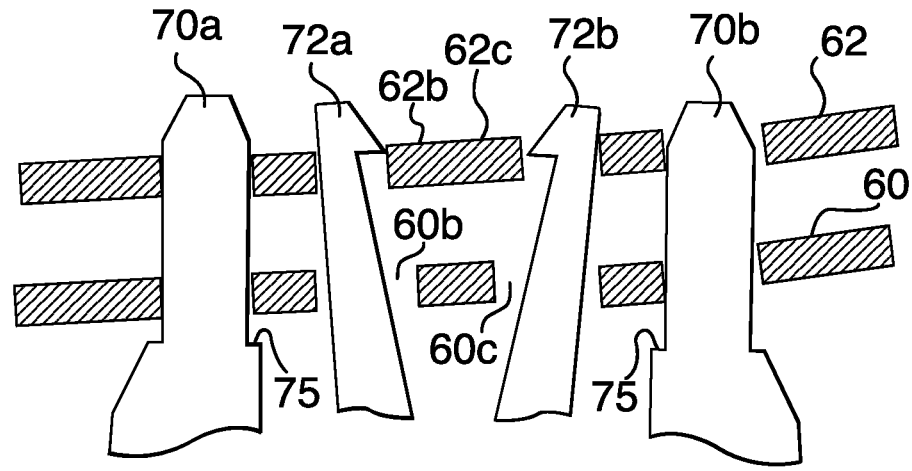
FIG. 31 is an enlarged fragmentary view of a releasable connection between the carrier and the shoe's base showing the release open and carrier projections cooperatively engaging slots in the shoe.
Figure 32:
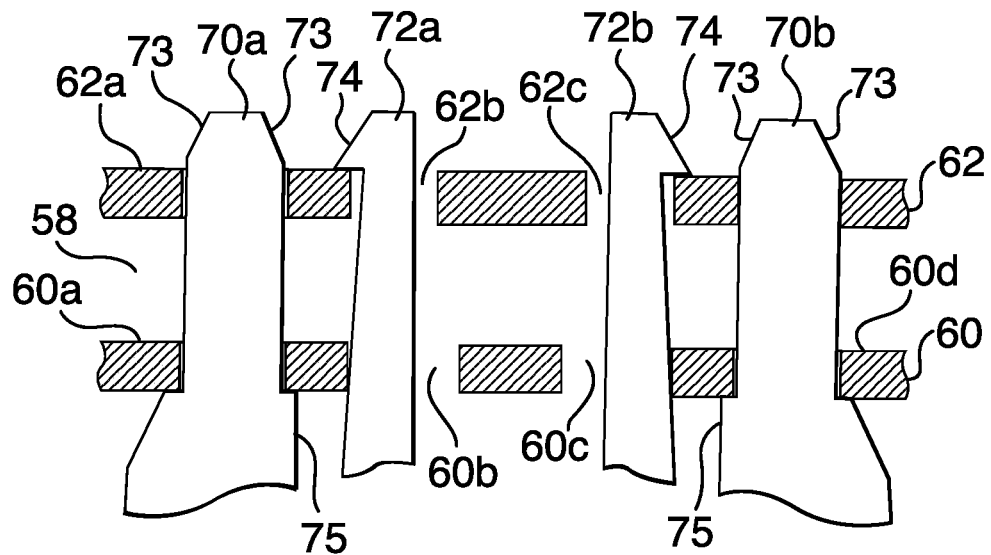
FIG. 32 is a view similar to FIG. 31 showing an enlarged fragmentary view of a releasable connection between the carrier and the shoe's base.
Figure 33:
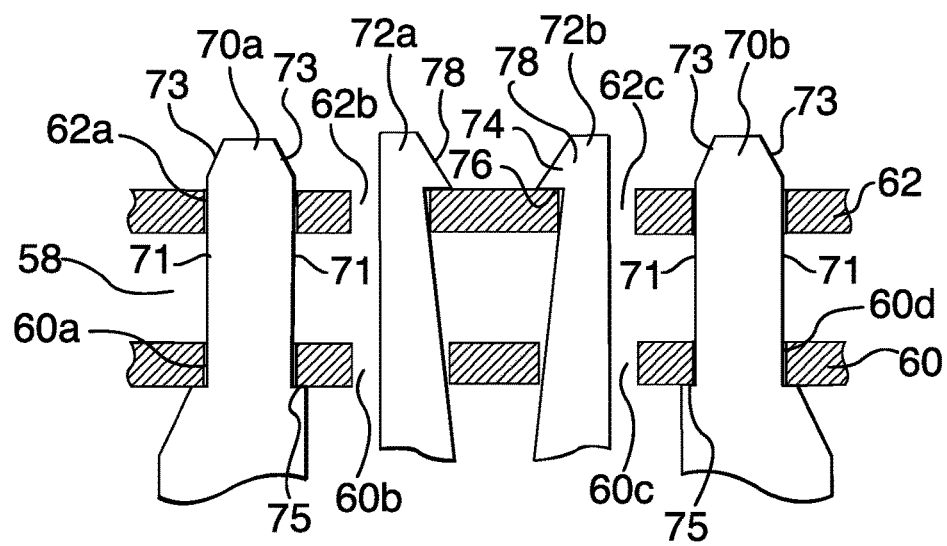
FIG. 33 is a view similar to FIG. 31, showing an alternative configuration of the releasable connection.

Mounted on the conveyor are roller shoe assemblies 20, each arranged to travel along a respective rail 15 in the transverse direction T. Each roller shoe assembly 20 includes a carrier 22 and a roller shoe 24 attached thereto. The carrier 22 includes a main body 26 arranged within the rail beneath the horizontal portions 10. Projecting downwardly from the main body 26 is a pin 32 on which a carrier wheel 34 can be rotatably mounted as shown in FIG. 28.

The frame 50 includes a recess defining roller shoe frame slots 60 at a selected location in the center member 55 which receives drive projections 70 (70a and 70b) and connector members 72 (72a and 72b) extending upward from the top of the carrier 22 cooperatively engaging same, preferably by a force fit as illustrated in Figures. The drive projections 70 extend through the slots 16 of the slats 10 and are received in the rolling shoe frame slots 60 (60a, 60b, 60c and 60d).

The carrier drive projections 70 and connectors 72 having center hook-shaped portions 61a that are provided midway between the outer hook-shaped portions 61, to provide additional support for the objects, but such center hook-shaped portions do not interact with the roller shoe assemblies, because the roller shoes include respective recesses in which the center hook-shaped portions are disposed. Each of the lower and upper panels 60, 62 has a set of openings formed therein. The lower openings 60a-d in the lower panel, and upper openings 62a-d formed in the upper panel. The lower openings 60a-d are vertically aligned with respective upper openings 62a-d.

The main body 26 of the carrier 22 includes four projections or tabs, namely, a pair of thin, flat upstanding drive projections 70a, 70b, and a pair of thin, flat upstanding connector projections 72a, 72b disposed between the drive projections. The four projections 70a,b and 72a and 72b lie in a common plane which contains the respective slot 16. The four projections project sequentially upwardly through the slot 16 of the respective support rail 15, the respective lower openings 60a-d and the respective upper openings 62a-d. The roller shoe assembly can be driven in the transverse direction T by the drive projections 70a,b. The roller shoe assemblies are driven in the conveying direction D by the support rails 15, due to the engagement of the feet end edges 65 within the grooves 69, whereas the drive projections 70a,b only drive the roller shoe assemblies in the transverse direction T, thereby enabling the drive projections to be relatively thin.

Each drive projection 70a and 70b includes opposite vertical surfaces 71 which engage the edges of a respective upper opening 62a and 62d for transferring drive forces from the carrier 22 to the roller shoe to displace the roller shoe in either direction along the slot 16. The upper end of each drive projection can be beveled to form two surfaces 73 which are inclined relative to vertical. Each of the drive projections 70a and 70b also includes an upwardly facing shoulder 75 on which the lower panel 60 of the base 52 rests during normal travel of the roller shoe assemblies.

Figure 27:
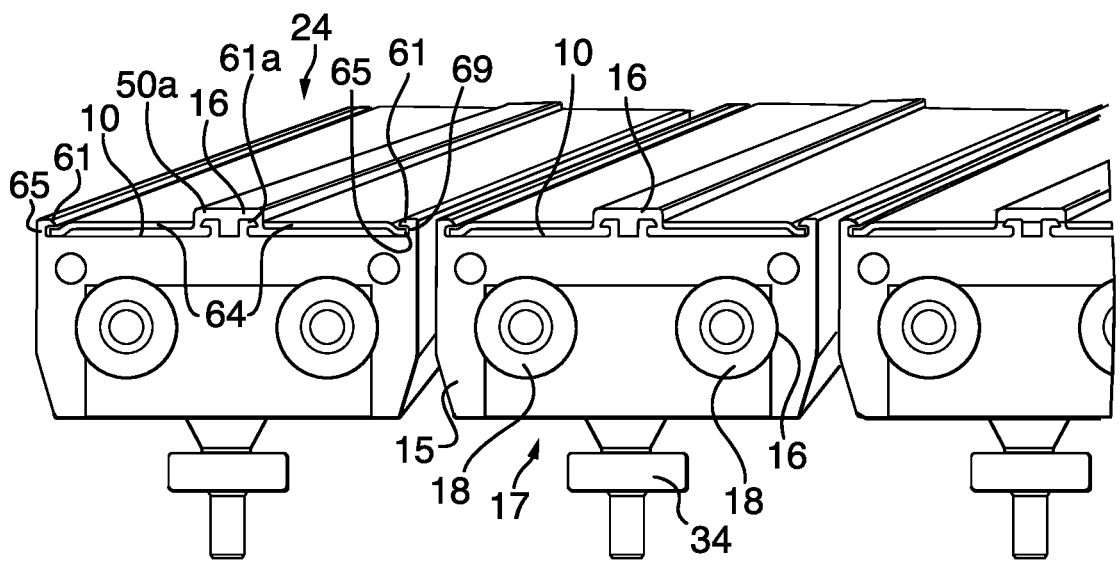
FIG. 27 shows an elevational view of one side of the roller shoe sorter showing the recessed gears in the ends of the slats and rails.

Each of the connector projections 72a and 72b are elastically flexible in the direction T and have a hook-shaped upper end, with the hooks 74 thereof pointing toward one another. Each hook 74 includes a downwardly facing shoulder 76 operating as a locking surface arranged to engage the upper surface of upper panel 62 surrounding a respective upper opening 62b and 62c operating as a cooperating locking surface to releasably connect the roller shoe 24 to the carrier 22. The downwardly facing shoulders 76 operating as a locking surfaces are biased against a respective upper surface of upper panel 62 operating as a cooperating locking surface and surrounding upper opening 62b and 62c. This biasing arrangement operates to bias roller shoes 24 down against surface 10 as shown in FIG. 27, which can help insure ends 65 of feet 64 of base 52 are positioned within the grooves 69. This biasing arrangement can also tend to urge the carrier upwardly to press the carrier 22 upwardly against undersides of the horizontal portions 10. Thus, the biasing arrangement can reduce rattling as the roller shoe assemblies move along the support rails 15.

Shoulders 75 associated with the drive projections 70a and 70b can operate to limit the biasing forces being exerted on roller shoe 24. For example, shoulder 75 can be positioned to limit how much downward force can be applied to roller shoe 24, thereby limiting the friction created as roller shoe 24 slides along the conveying surface 10. Shoulders can additionally or alternatively be positioned to increase the locking force pressing the downwardly facing shoulders 76 or locking surfaces against respective upper surfaces of upper panel 62 or cooperating locking surfaces. Thus, the biasing arrangement can generate a high locking biasing force at the interface of the locking surfaces associated with the connector projections while generating a much smaller downward force at the interface between roller shoe 24 and conveying surface 10.

Each of the openings 60b, 60c, 62b and 62c can be of greater width than the section of the respective connector projection 72a, 72b disposed therein. In the normal condition of the roller shoe assemblies the shoulders 76 of the hooks 74 overlie respective surface areas of the upper panel 62 operating as a cooperating connector member to thereby secure the roller shoe 24 to the carrier 22.

If while pushing an object toward a destination, the object may encounter a jam-up of objects, wherein the ends of the roller shoes pushing the object become subjected to a resistance force F, the object will encounter the shoe ramp 63 and move upward and onto the rollers of the roller shoe. Should the force cause the end of a roller shoe to be forced upward. The hooks of the respective connector projections 72a and 72b flex allowing the roller shoe to become detached from the carrier 22 without damaging or breaking any of the parts of the roller shoe assembly. After the jam-up is removed, the detached roller shoe(s) can easily be manually reattached to the carrier without requiring the use of any tools by simply positioning the roller shoe 24 and pressing downwardly on the roller shoe 24 such that the lower panel 60 passes downwardly along the drive projections 70a and 70b aided by the beveled upper ends 73 of those drive projections. Each hook 74 can also include an upwardly facing surface 78 which can be inclined relative to vertical and disposed in downwardly converging relationship with the inclined surface 78 of an adjacent connector projection. The upper panel 62 will contact the downwardly converging surfaces 78 of the connector projections 72a and 72b to elastically spread the connector projections away from one another. That enables the upper panel 62 to move downwardly past the hooks 74, whereupon the connector projections snap back to the state shown in FIG. 7. The upper panel 62 will also slide down along the drive projections 70a and 70b aided by the beveled upper ends 73 of the drive projections.

The carrier's connector 72a and 72b and projections 70a and 70b cooperatively engage the panel 62 with its upper surface and associated openings 62b and 62c forming a releasable connection between the roller shoe and the carrier which prevents damage occurring to either the roller shoe or the carrier when the roller shoe is detached in response to encountering a jam-up of discharging objects.

In an alternate embodiment, the connector projections can be arranged with their hooks 74 pointing toward each other, the hooks could instead point away from one another.

The roller shoe frame base rest and slides on the slated surface of the conveyor. The roller wheels float on the supporting surface with the roller axles floating in the up position in the grooved slots of the inner walls of the frame sidewall. As shown in the figures, when an object contacts the roller wheel and slides up onto the frame the weight of the objected is transferred to the roller wheels which roll at twice the speed of the frame moved by the conveyor moving the object toward the sides of the slated conveyor.

As shown in FIGS. 39-44 the slat conveyor shows conveyance of packages diverted to either side of the conveyor on roller shoes. A second roller shoe abuts a package pushed by the adjacent first roller shoe. The package is pushed over the wedge shaped end and onto the rollers of the second roller shoe and supported thereon and the second roller shoe moves in alignment with the first roller shoe to support the package. The package is supported by the rollers moving toward a side of the conveyor.

Releasable connections include alternative snap-fit connections that have cooperating protrusions and detents.

The method of using the roller shoe is includes using a sorter conveyor for use with an endless upwardly facing conveying surface movable in a conveying direction, the conveying surface defined by a plurality of surface separated by plurality slots extending in a transverse direction, the conveying surface defined by a plurality of surfaces, separated by a plurality of slots extending in a transverse direction relative to the conveying direction is set forth as follows. A roller shoe and slat sorter conveyor provides a plurality of shoe assemblies, with each shoe assembly comprising a shoe disposed above the conveying surface and a carrier disposed below the conveying surface, and with each of the plurality of shoe assemblies extending through at least one of the slots in the conveying surface, and each shoe comprising an elongated roller shoe including a frame having downward slanting ends and a plurality of roller wheels extending above the surface of the frame mounted to axles movable in a vertical axis. An article resting on the rollers of the shoe depresses the rollers so they contact the slat surface and move an article resting thereon in a transverse direction at a faster rate of speed as the shoe, for instance, twice the speed of the shoe. The shoe is coupling to the carrier together using a snap-fit connection causing at least some of the shoe assemblies to move in the transverse direction which also moving thin the conveying direction with the conveying surface. Upon exposure to an undesirable force acting upon the shoe, the shoe automatically detaching from the carrier at the snap-fit connection without damaging any part of the shoe assembly, including the snap-fit connection. After such detaching, fully reattaching the shoe to the carrier manually without the use of tools using the undamaged shoe, including the undamaged snap-fit connection.

Figure 35:
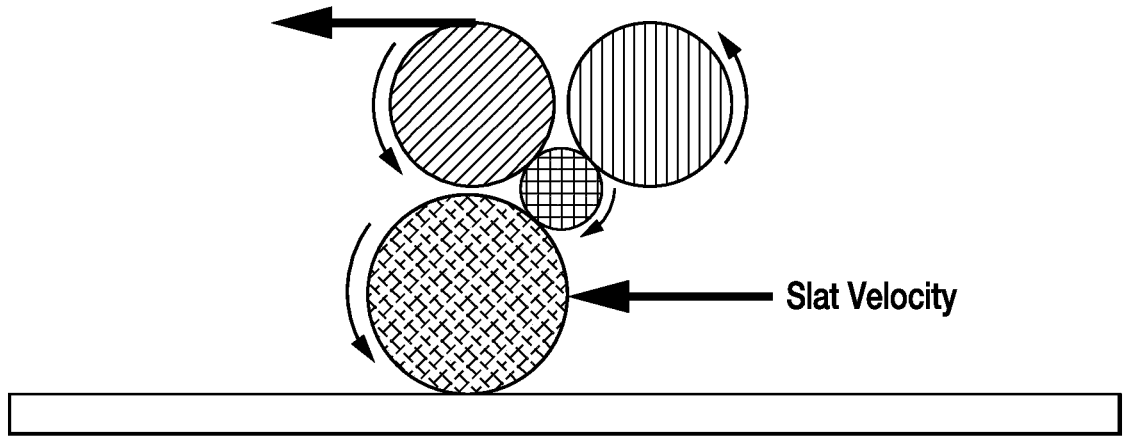
FIG. 35 shows a gear ratio setup using a driving wheel A on the slat with th carriage, and wheel B to maintain direction for wheel C to provide a variable gear ratio of less than 2, equal to 2, or greater than 2; and Wheel D can be setup to run on Wheel B so that Wheel D has the same surface Speed as Wheel C, which is useful if Wheel A is much bigger than Wheel C, or if there is an obstruction. The current image is shown as wheel to wheel contact, but this could also be done with gearing, or a belting system (if wheel B is removed) as shown in FIG. 36.
Figure 36:
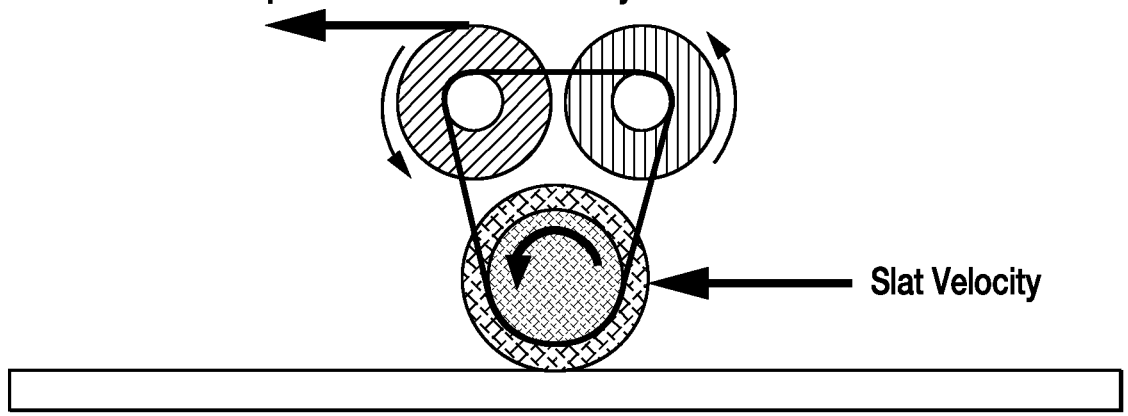
FIG. 36 shows a gear ratio setup wherein the roller surface speed is a ratio created by A and C using a belt.
Figure 38A:
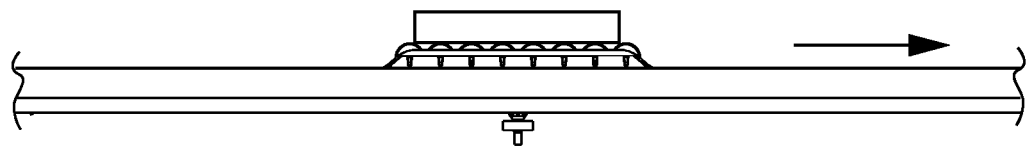
FIG. 38A shows the shoe moving from left to right and the package moving over and off of the top of the shoe, which is a bi-directional design in view of the ramp on each end of the shoe.
Figure 38B:
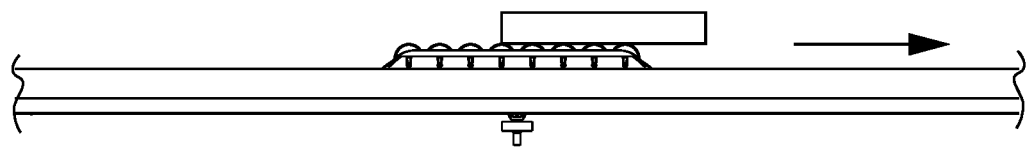
FIG. 38B shows the shoe moving from left to right and the package moving over and off of the top of the shoe, which is a bi-directional design in view of the ramp on each end of the shoe.
Figure 38C:
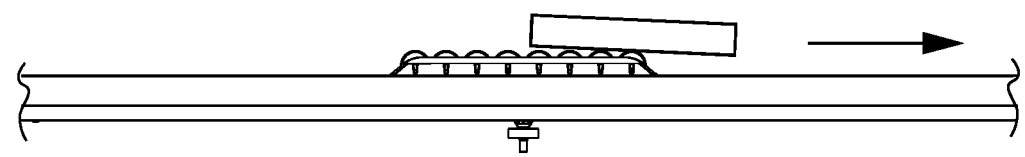
FIG. 38C shows the shoe moving from left to right and the package moving over and off of the top of the shoe, which is a bi-directional design in view of the ramp on each end of the shoe.
Figure 38D:
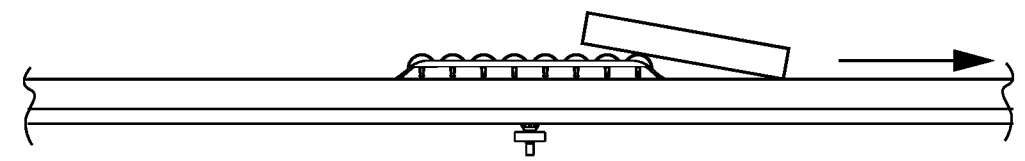
FIG. 38D shows the shoe moving from left to right and the package moving over and off of the top of the shoe, which is a bi-directional design in view of the ramp on each end of the shoe.
Figure 38E:
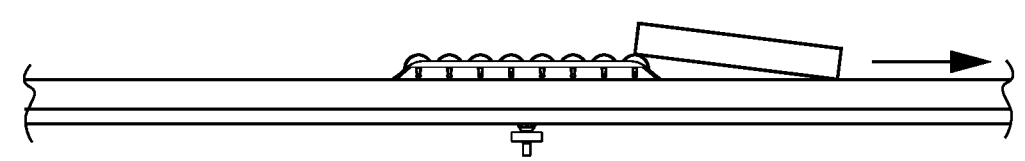
FIG. 38E shows the shoe moving from left to right and the package moving over and off of the top of the shoe, which is a bi-directional design in view of the ramp on each end of the shoe.
Figure 38F:
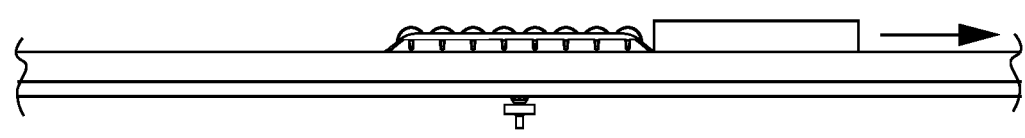
FIG. 38F shows the shoe moving from left to right and the package moving over and off of the top of the shoe, which is a bi-directional design in view of the ramp on each end of the shoe.

As shown in FIG. 35 a gear ratio setup is used for a driving wheel A on the slat with th carriage, and wheel B to maintain direction for wheel C to provide a variable gear ratio of less than 2, equal to 2, or greater than 2; and Wheel D can be setup to run on Wheel B so that Wheel D has the same surface Speed as Wheel C, which is useful if Wheel A is much bigger than Wheel C, or if there is an obstruction. The current image is shown as wheel to wheel contact, but this could also be done with gearing, or a belting system (if wheel B is removed) as shown in FIG. 36.

Figure 34:
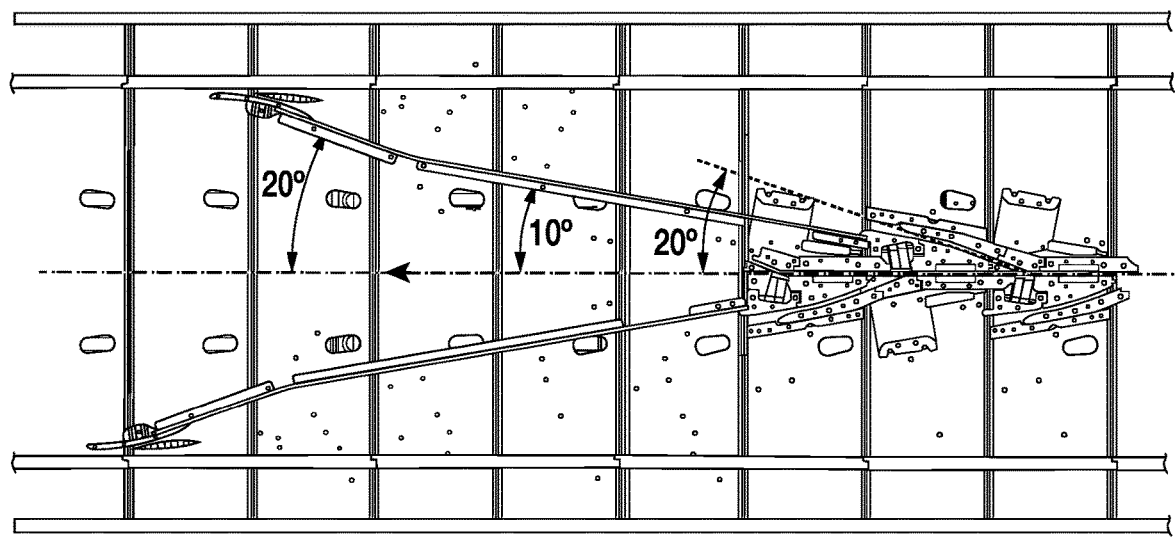
FIG. 34 is a top view of a two switch rail system and diverter switch showing the rail angles, length of the curved sections.

As shown in FIG. 34, a two switch rail system and diverter switch can be employed for the following invention. As shown in the example, sorter speed is 400 feet per minute FPM, diverter speed near the wall is 136 FPM at a 20 degree angle, 70 FPM at a 10 degree angle and 20 degree angle leaving the feed conveyor. A diverter mounting below the slat conveyor is in flow communication with the carrier rollers for deflecting the roller shoes on the conveyor slats at the selected position to move the conveyed articles off of the conveyor. The figures show a two switch rail system and diverter switch and the rail angles, length of the curved sections and speed in feet per minute of shoe speed. Cameras, photo eyes, scanners and other sensors or combinations thereof can be used to predetermine the position of a package on the slat conveyor prior to contact with the roller shoe and after engagement of the roller shoe until the package or object has been transferred from the roller shoe and/or slat conveyor onto a side chute.

The foregoing description of the embodiments has been provided for purposes of illustration and description. It is not intended to be exhaustive or to limit the disclosure. Individual elements, features, or steps of a particular embodiment are generally not limited to that particular embodiment, but, where applicable, are interchangeable and can be used in other embodiments, even if the resulting combination is not specifically illustrated or described herein. The same may also be varied in any way as to the inclusion or not of other individual elements, features, or steps. Such variations are not to be regarded as a departure from the disclosure, and all such modifications are intended to be included within the scope of the disclosure.

What is claimed is:

1. A sorter conveyor apparatus comprising:
an endless upwardly facing conveying surface movable in a conveying direction, the conveying surface defined by a plurality of slats separated by a plurality of slots extending in a transverse direction relative to the conveying direction;
a plurality of roller shoe assemblies, each roller shoe assembly comprising a roller shoe disposed above the conveying surface and a carrier disposed below the conveying surface, each of the plurality of roller shoe assemblies extending through at least one of the slots in the conveying surface to permit each roller shoe assembly to move in the transverse direction while also moving in the conveying direction with the conveying surface;
said roller shoe comprising:
a) a frame including a first side rail and second side rail connected by opposing downward sloped end portions, said opposing end portions joining by a longitudinal center member disposed equal distance between the first side rail and second side rail, said frame including a base comprising a pair of longitudinal ribbed runners having end edges in cooperative engagement and in a slidable relationship with said slat, said frame including a recess at a selected location in said center member for receiving a plurality of drive projections extending upward from a top of said carrier;
b) each one of said roller wheel removably mounted on an axle comprising a pair of opposing split axles, each one having an outer cap with a circumferential flange extending around the proximal portion of said cap and a generally tapered cylindrical body extending there from;
c) each one of said opposing split axles cooperatively engage an opposing grooved slot formed in an opposing sidewall of a first channel and a second channel parallel and spaced apart and formed in said shoe frame between a longitudinal center member and said respective first side rail and said second side rail;
d) said roller shoe including a plurality of roller wheels, each roller wheel formed of a material having a high friction surface, said roller wheel comprising a compressible polymer of a selected hardness, said roller wheel having a hub including a socket formed in said hub engaging said tapered cylindrical body and said flange releasably holding each of said split axles in position within said socket, said split axles being press fit in said hub and snapped into a locking position permitting vertical movement of said split axles within said grooved slot of said rolling shoe frame; and
each of the roller shoe assemblies comprising a snap-fit connection coupling the roller shoe and the carrier together, wherein the snap-fit connection has a structure which permits the roller shoe to detach from the carrier in response to an undesirable force acting on the roller shoe without damaging any part of the roller shoe assembly.

2. The sorter conveyor apparatus of claim 1, wherein the roller shoe comprises polyoxymethylene.

3. The sorter conveyor apparatus of claim 1, wherein said roller shoe wheel comprises a urethane.

4. The sorter conveyor apparatus of claim 1, wherein the roller shoe comprises a base and a frame above the conveying surface, and the snap-fit connection is positioned to detach both the base and frame from the carrier in response to the undesirable force acting on the roller shoe.

5. The sorter conveyor apparatus of claim 1, wherein the endless conveying surface comprises a groove extending in the transverse direction formed by hooked shaped portion extending in one of the conveying direction and an opposite direction to the conveying direction, and wherein the roller shoe comprises a cooperating edge captured by the hook shaped portion and allowing the edge to slide along the groove.

6. The sorter conveyor apparatus of claim 5, wherein the endless conveying surface comprises an other groove extending in the transverse direction formed by an other hooked shaped portion extending in the other of the conveying direction or an opposite direction to the conveying direction, and wherein the roller shoe comprises an other cooperating edge captured by the other hook shaped portion and allowing the other edge to slide along the other groove.

7. The sorter conveyor apparatus of claim 1, wherein the snap-fit connection comprises a connector projection, and wherein the roller shoe assemblies further comprise a drive projection adjacent the connector projection to transfer forces between the roller shoe and the carrier when the roller shoe is driven in the transverse direction without the connector projection detaching absent exposure to an undesirable force.

8. The sorter conveyor apparatus of claim 7, wherein at least one of the connector projection and the drive projection extends from the carrier through one of the plurality of slots and above the conveying surface.

9. The sorter conveyor apparatus of claim 1, wherein the snap-fit connection comprises a connector projection including a locking surface on one of the roller shoe and the carrier and a cooperating connector member including a cooperating locking surface opposing the locking surface on an other of the roller shoe and the carrier, wherein the locking surface and the cooperating locking surface are biased against each other.

10. The sorter conveyor apparatus of claim 1, including a clip for retaining said split axles in said grooved slot.

11. The sorter conveyor apparatus of claim 1 wherein said frame base slides on said slat conveyor when pushing or moving across said conveyor, and upon an object sliding upon said roller wheels of said roller shoe, said roller wheels extending below said frame base and supporting said roller shoe and object thereon.

12. The sorter conveyor apparatus of claim 11, wherein said object supported by said roller wheels within said frame moves at twice the speed of said roller shoe sliding along said slat.

13. A sorter conveyor method for use with an endless upwardly facing conveying surface movable in a conveying direction, the conveying surface defined by a plurality of slat surfaces separated by a plurality of slots extending in a transverse direction relative to the conveying direction, the method comprising:
   providing a plurality of shoe assemblies, with each shoe assembly comprising a shoe disposed above the conveying surface and a carrier disposed below the conveying surface, and with each of the plurality of shoe assemblies extending through at least one of the slots in the conveying surface, and each shoe comprising an elongated roller shoe including a frame having downward slanting ends and a plurality of roller wheels extending above the surface of said frame mounted to axles movable in a vertical axis whereby an article resting on the rollers of said shoe depressing the rollers so they contact the slat surface and move an article resting thereon in a transverse direction at twice the speed of the shoe;
   coupling the shoe and the carrier together using a snap-fit connection;
   causing at least some of the shoe assemblies to move in the transverse direction which also moving thin the conveying direction with the conveying surface;
   upon exposure to an undesirable force acting upon the shoe, the shoe automatically detaching from the carrier at the snap-fit connection without damaging any part of the shoe assembly, including the snap-fit connection;
   after such detaching, fully reattaching the shoe to the carrier manually without the use of tools using the undamaged shoe, including the undamaged snap-fit connection.

14. A slat sorter conveyor and roller shoe apparatus, comprising:
   an endless upwardly facing conveying surface movable in a conveying direction, said conveying surface defined by a plurality of surfaces separated by a plurality of slots extending in a transverse direction relative to the conveying direction;
   a plurality of roller shoe assemblies, each roller shoe assembly comprising a roller shoe disposed above the conveying surface and a carrier disposed below the conveying surface, each of said plurality of said roller shoe assemblies extending through at least one of the slots in the conveying surface to permit each roller shoe assembly to move in the transverse direction while also moving in the conveying direction with the conveying surface;
   each one of said roller shoe assemblies including a plurality of roller wheels, each roller wheel formed of a material having a high friction surface, said roller wheel comprising a compressible polymer of a selected hardness, said roller wheel having a hub including a socket formed in said hub engaging said tapered cylindrical body and said flange releasably holding each of said split axles in position within said socket, said split axles being press fit in said hub and snapped into a locking position permitting vertical movement of said split axles within said grooved slot of said rolling shoe frame;
   each of said plurality of roller wheel assemblies comprising a snap-fit connection coupling said roller shoe and said carrier together, wherein said snap-fit connection has a structure which permits the roller shoe to detach from said carrier in response to a force acting on said roller shoe without damaging any part of said roller shoe assembly, and wherein the snap-fit connection has a structure that permits the roller shoe to be fully recoupled to said carrier manually without the use of tools after being detached from said carrier.

15. A slat sorter roller shoe assembly comprising:
   a roller shoe comprising:
   a) a frame including a first side rail and second side rail connected by opposing downward sloped end portions, said opposing end portions joining by a longitudinal center member disposed equal distance between the first side rail and second side rail, said frame including a base comprising a pair of longitudinal ribbed runners having end edges in cooperative engagement and in a slidable relationship with said slat, said frame including a recess at a selected location in said center member for receiving a plurality of drive projections extending upward from a top of said carrier;
   b) a plurality of roller wheels removably mounted on a split axles, each one having an outer cap with a circumferential flange extending around the proximal portion of said outer cap and a generally tapered cylindrical body extending there from;
   c) each end of said split axles cooperatively engage an opposing grooved slot formed in an opposing sidewall of a first channel and a second channel parallel and spaced apart and formed in a shoe frame between a longitudinal center member and said first side rail and said second side rail;
   d) each one of said plurality of roller wheels formed of a material having a high friction surface, said plurality of roller wheels comprising a compressible polymer of a selected hardness, each one of said plurality of roller wheels having a hub including a socket formed in said hub engaging said tapered cylindrical body and said circumferential flange releasably holding each of said split axles in position within said socket, said split axles being press fit in said hub and snapped into a locking position permitting vertical movement of said split axles within said grooved slot of said shoe frame; and
   said roller shoe including a snap-fit connection coupling said roller shoe and a carrier together, wherein said snap-fit connection has a structure which permits the roller shoe to detach from the carrier in response to an undesirable force acting on the roller shoe without damaging any part of the roller shoe assembly.

16. A slat sorter roller shoe assembly comprising:
   a roller shoe comprising:
   a) a frame including a first side rail and second side rail connected by opposing downward sloped end portions, said opposing end portions joining by a longitudinal center member disposed equal distance between the first side rail and second side rail, said frame including a base comprising a pair of longitudinal ribbed runners having end edges in cooperative engagement and in a slidable relationship with said slat, said frame including a recess at a selected location in said center member for receiving a plurality of drive projections extending upward from a top of said carrier;

b) a plurality of roller wheels removably mounted on a split axles, each one having an outer cap with a circumferential flange extending around the proximal portion of said outer cap and a generally tapered cylindrical body extending there from;

c) each end of said split axles cooperatively engage an opposing grooved slot formed in an opposing sidewall of a first channel and a second channel parallel and spaced apart and formed in a shoe frame between a longitudinal center member and said first side rail and said second side rail;

d) each one of said plurality of roller wheels formed of a material having a high friction surface, said plurality of roller wheels comprising a compressible polymer of a selected hardness, each one of said plurality of roller wheels having a hub including a socket formed in said hub engaging said tapered cylindrical body and said circumferential flange releasably holding each of said split axles in position within said socket, said split axles being press fit in said hub and snapped into a locking position permitting vertical movement of said split axles within said grooved slot of said shoe frame;

said roller shoe frame including a recess at a selected location for receiving a plurality of drive projections of a snap-fit connection extending upward from a top of a carrier including a vertical pin and horizontal guide wheel extending from the bottom of said carrier held in slidable engagement within a slot of a slat conveyor; and said roller shoe including a snap-fit connection coupling said roller shoe and said carrier together, wherein said snap-fit connection has a structure which permits the roller shoe to detach from the carrier in response to an undesirable force acting on the roller shoe without damaging any part of the roller shoe assembly.

17. A sorter conveyor method for use with an endless upwardly facing conveying surface movable in a conveying direction, said conveying surface defined by a plurality of slat surfaces separated by a plurality of slots extending in a transverse direction relative to the conveying direction, the method comprising:

providing a plurality of shoe assemblies, with each shoe assembly comprising a shoe disposed above said conveying surface extending through at least one of said plurality of slots in said conveying surface releasably coupled to a carrier disposed below said conveying surface by a snap-fit connection, with each shoe comprising an elongated roller shoe including a frame having downward slanting ends and a plurality of roller wheels extending above a surface of said frame mounted to axles movable in a vertical axis;

said shoe coming into contact with an article on said conveying surface lifting said article onto said roller wheels, whereby an article resting on said roller wheels of said shoe depresses said rollers contacting said slat surfaces;

moving an article resting on said roller wheels in a transverse direction at an article speed greater than a shoe speed; and causing said article resting on said roller wheels to move in a transverse direction and in a forward conveying direction with respect to said conveying surface.

18. The sorter conveyor method of claim 17, including the step of automatically detaching said shoe from said carrier at said snap-fit connection without damaging any part of said shoe assembly upon exposure to an undesirable force acting upon said shoe.

19. The sorter conveyor method of claim 17, whereby an article resting on said roller wheels of said shoe depresses said roller wheels contacting said slat surface and moving an article resting thereon at twice the speed of said shoe.

20. The sorter conveyor method of claim 17, including the step of positioning said roller shoes from a center position on said conveying surface to contact articles moving said articles to either side of said conveying surface.

21. The sorter conveyor method of claim 17, including the step of supporting said roller wheels within said frame with said axle disposed in a vertical slot for floating up and down with limited movement in horizontal direction.

22. The sorter conveyor method of claim 17, wherein a roller shoe frame rest and slides on said slated surface of said conveying surface and said roller wheels float on said slat surface with said roller axle floating in an up position in a grooved slot of an inner wall of said frame sidewall.

23. The sorter conveyor method of claim 17, including the step of supporting said roller wheels on top surface of said slat surfaces whereby traction to create acceleration in a left or right direction is a function of said roller wheel on said slat when weight is placed on said roller wheel axle and transferred to said roller wheel.

24. The sorter conveyor method of claim 17, wherein said roller shoe wherein said snap-fit connection pops off upon reaching a predetermined amount of force.

25. The sorter conveyor method of claim 17, wherein said roller shoe roller shoe having a downward sloped front end and a downward sloped back end to lift an article up onto said shoe and resist a scissoring action and binding action of said roller wheels and enabling a smaller gap between roller shoes for greater capacity as opposed to conventional roller shoe sorters having pushers.

26. The sorter conveyor method of claim 17, including the step of moving short and long articles up against one another as compared to conventional pushers have fixed cell sizes "compartments" limiting capacity.

27. The sorter conveyor method of claim 17, including the step of utilizing a detection means selected from the group consisting of cameras, photo eyes, scanners, and combinations to predetermine a position of an article on said conveying surface prior to contact with said roller shoe and/or after engagement of said roller shoe until said article has been transferred from said conveying surface onto a side chute.

28. A slat sorter conveyor and roller shoe apparatus, comprising:

an endless upwardly facing conveying surface movable in a conveying direction, said conveying surface defined by a plurality of slat surfaces separated by a plurality of slots extending in a transverse direction relative to a conveying direction;

a plurality of roller shoe assemblies, each roller shoe assembly comprising a roller shoe disposed above said conveying surface and a carrier disposed below said conveying surface, each of said plurality of said roller shoe assemblies extending through at least one of said slots in said conveying surface to permit each roller shoe assembly to move in said transverse direction while also moving in a forward conveying direction with said conveying surface;

each shoe comprising an elongated roller shoe including a frame having downward slanting ends and a plurality of roller wheels extending above a surface of said frame mounted to axles movable in a vertical axis whereby an article resting on said roller wheels of said shoe depressing roller wheels contacting said slat surface and move an article resting thereon in a transverse direction at twice a speed of said shoe; and said roller shoe including a snap-fit connection coupling said roller shoe and said carrier together, said roller shoe having a frame including a recess at a selected location for receiving a plurality of drive projections of said snap-fit connection extending upward from a top of a carrier including a vertical pin and horizontal guide wheel extending from a bottom of said carrier held in slidable engagement within a slot of a slat conveyor.

29. The slat sorter conveyor and roller shoe apparatus of claim 28, further comprising a split axle with spindles extending from said hub on each side of said roller wheel, whereby an end of said axle is pushed into a vertical slot in a sidewall of said roller shoe and removably held in position by retaining means holding said roller wheel in a spring loaded position.

30. The slat sorter conveyor and roller shoe apparatus of claim 28, wherein said plurality of roller wheels extending above a surface of said shoe are mounted to said axles movable in a vertical axis whereby an article resting on said roller wheels of said shoe depressing said roller wheels contacting said slat surface and moving said article resting thereon.

31. The slat sorter conveyor and roller shoe apparatus of claim 28, further wherein said articles resting on said roller wheels move at twice the speed of said shoe.

32. The slat sorter conveyor and roller shoe apparatus of claim 28, wherein said roller wheels are composed of a compressible flexible material.

33. The slat sorter conveyor and roller shoe apparatus of claim 32, wherein said compressible flexible material is a urethane having an selected durometer hardness (A-D).

34. The slat sorter conveyor and roller shoe apparatus of claim 28, wherein said roller wheels are molded having 90 degree edges or rounded or angled shoulders.

35. The slat sorter conveyor and roller shoe apparatus of claim 28, further comprising a plurality of rolling wheels disposed in a row in a first channel and a second channel supported by said axles extending between a hub of each wheel and a grooved slot formed in an inner side wall of a first rail and a second rail, and aligned with complementary grooved slots formed in an inner sidewall of said first rail, said second rail, and a longitudinal center member, said grooved slot having a retainer means for limiting vertical movement of said axle within said grooved slot for limited vertical movement.

36. The slat sorter conveyor and roller shoe apparatus of claim 28, wherein said split axles include a tapered distal end portion and are press fitted into a hub portion of said roller wheel whereby a flange limits a depth of said axle and releasably holds it in position within said rolling wheel hub allowing for vertical movement of said axle within said grooved slot of said rolling shoe frame.

* * * * *